United States Patent
Patel et al.

(10) Patent No.: US 12,552,999 B2
(45) Date of Patent: Feb. 17, 2026

(54) CHLORIDE REMOVAL FOR PLASTIC WASTE CONVERSION

(71) Applicant: ExxonMobil Chemical Patents Inc., Baytown, TX (US)

(72) Inventors: Bryan A. Patel, Jersey City, NJ (US); Clara M. Buchanan, Houston, TX (US); Saurabh S. Maduskar, Houston, TX (US); Brenda A Raich, Annandale, NJ (US); Fritz A. Bernatz, Spring, TX (US); Cody M. Diaz, Raritan, NJ (US)

(73) Assignee: ExxonMobil Chemical Patents Inc., Spring, TX (US)

( * ) Notice: Subject to any disclaimer, the term of this patent is extended or adjusted under 35 U.S.C. 154(b) by 162 days.

(21) Appl. No.: 18/554,093

(22) PCT Filed: Mar. 18, 2022

(86) PCT No.: PCT/US2022/020940
§ 371 (c)(1),
(2) Date: Oct. 5, 2023

(87) PCT Pub. No.: WO2022/220991
PCT Pub. Date: Oct. 20, 2022

(65) Prior Publication Data
US 2024/0191148 A1  Jun. 13, 2024

Related U.S. Application Data

(60) Provisional application No. 63/174,644, filed on Apr. 14, 2021.

(51) Int. Cl.
C10G 55/06 (2006.01)
C08J 11/10 (2006.01)

(52) U.S. Cl.
CPC .............. *C10G 55/06* (2013.01); *C08J 11/10* (2013.01); *C08J 2327/06* (2013.01);
(Continued)

(58) Field of Classification Search
CPC . B29C 49/06; B29C 61/02; B29C 2949/0715; B29C 49/642; B29C 49/6472;
(Continued)

(56) References Cited

U.S. PATENT DOCUMENTS 3,702,886 A  11/1972  Argauer et al. ............... 423/328
3,709,979 A   1/1973  Chu ............................. 423/328
(Continued)

FOREIGN PATENT DOCUMENTS

CN  101230284  6/2013  ............. C08J 11/10
EP  0229295    7/1987  ............. C10G 45/64
(Continued)

OTHER PUBLICATIONS

Ali, M. F. et al. (2005) "Thermal and Catalytic Decomposition Behavior of PVC Mixed Plastic Waste with Petroleum Residue," *Jrnl. Analytical and Applied Pyrolysis*, v.74(1-2), pp. 282-289.

*Primary Examiner* — Ellen M Mcavoy
*Assistant Examiner* — Chantel Graham

(57) ABSTRACT

Systems and methods are provided for reducing or minimizing the chloride content of products generated during co-processing of a plastic feedstock (such as plastic waste) in a refinery process. The reduction in chloride is achieved by mixing the plastic feedstock with one or more additional feedstocks for co-processing in a mixing and/or holding vessel that is maintained at a dechlorination temperature that allows for decomposition of chlorine from the plastic feedstock to form HCl, while reducing or minimizing other conversion of the plastic feedstock and/or the additional feedstock. A purge gas can be passed through the mixing/
(Continued)

holding vessel to remove the evolved HCl from the vessel. Because the dechlorination temperature is selected to reduce or minimize conversion of the feedstocks in the mixture, the amount of carbon-containing products that are removed with the purge gas can be reduced or minimized. The dechlorinated mixture of plastic feedstock and additional feedstock(s) can then be processed in a convenient refinery process, such as a thermal cracking process (e.g., coking, visbreaking, other types of pyrolysis) or a catalytic conversion process (e.g., fluid catalytic cracking).

25 Claims, 9 Drawing Sheets

(52) U.S. Cl.
CPC ..... *C08J 2327/08* (2013.01); *C10G 2300/201* (2013.01); *C10G 2300/4006* (2013.01)

(58) Field of Classification Search
CPC .... B29C 49/66055; C08F 114/06; C08F 8/26; C08J 11/10; C08J 11/12; C08J 2327/04; C08J 2327/06; C08J 2327/08; C10B 53/07; C10B 55/02; C10B 55/10; C10B 57/045; C10G 1/002; C10G 1/10; C10G 11/18; C10G 2300/1011; C10G 2300/201; C10G 2300/4006; C10G 2300/4081; C10G 55/02; C10G 55/06; C10G 69/04; C10G 9/005; C10G 9/007
See application file for complete search history.

(56) References Cited

U.S. PATENT DOCUMENTS

| | | | | |
|---|---|---|---|---|
| 3,770,614 A | 11/1973 | Graven | | 208/62 |
| 3,832,449 A | 8/1974 | Rosinski et al. | | 423/328 |
| 3,948,758 A | 4/1976 | Bonacci et al. | | 208/92 |
| 4,016,245 A | 4/1977 | Plank et al. | | 423/328 |
| 4,076,842 A | 2/1978 | Plank et al. | | 423/328 |
| 4,108,730 A | 8/1978 | Chen et al. | | 201/2.5 |
| 4,118,281 A | 10/1978 | Yan | | 201/2.5 |
| 4,229,424 A | 10/1980 | Kokotailo | | 423/328 |
| 4,254,297 A | 3/1981 | Frenken et al. | | 585/640 |
| 4,310,440 A | 1/1982 | Wilson et al. | | 252/435 |
| 4,440,871 A | 4/1984 | Lok et al. | | 502/214 |
| 4,500,651 A | 2/1985 | Lok et al. | | 502/208 |
| 5,472,596 A | 12/1995 | Kerby et al. | | 208/127 |
| 5,705,724 A | 1/1998 | Collins et al. | | 585/446 |
| 5,841,011 A * | 11/1998 | Hashimoto | | C10G 1/002 201/2.5 |
| 6,011,187 A | 1/2000 | Horizoe et al. | | 585/241 |
| 6,172,275 B1 | 1/2001 | Tadauchi et al. | | 588/228 |
| 6,861,568 B1 | 3/2005 | Guffey et al. | | 585/241 |
| 9,920,255 B2 | 3/2018 | Hofer | | C10G 1/10 |
| 10,829,696 B2 | 11/2020 | Javeed et al. | | C10G 1/10 |
| 2016/0024390 A1 | 1/2016 | Ullom | | C10B 57/02 |
| 2019/0062646 A1 | 2/2019 | Hakeen et al. | | C10G 45/08 |
| 2022/0372375 A1 | 11/2022 | Patel et al. | | C10G 1/10 |

FOREIGN PATENT DOCUMENTS

| | | | | |
|---|---|---|---|---|
| EP | 2649121 | 6/2012 | | C08J 11/16 |
| EP | 2649121 B1 * | 1/2017 | | C08J 11/16 |
| JP | H11-310659 | 11/1999 | | C08J 11/00 |
| JP | 3297322 | 7/2002 | | C08J 11/00 |
| PL | 216590 | 4/2014 | | C10G 1/10 |
| WO | WO1995/014069 | 5/1995 | | C10G 9/14 |
| WO | WO2017/083018 | 5/2017 | | C10G 45/06 |
| WO | WO2018/025103 | 2/2018 | | C10G 1/08 |

* cited by examiner

CHLORIDE REMOVAL FOR PLASTIC WASTE CONVERSION

CROSS-REFERENCE TO RELATED APPLICATIONS

This application claims the priority benefit of U.S. Ser. No. 63/174,644, filed Apr. 14, 2021, which is incorporated herein by reference.

FIELD

Systems and methods are provided for chloride removal during processing of plastic waste.

BACKGROUND

One pathway for recycling of plastic waste is to combine plastic waste with conventional petroleum feedstocks for co-processing in conventional refinery processes, such as thermal conversion processes (such as coking, visbreaking, or other pyrolysis) and/or catalytic conversion processes (such as fluid catalytic cracking). However, attempting to incorporate waste plastic into a conventional refinery process flow can pose a variety of challenges.

One difficulty is accommodating the fact that many plastics correspond to solids at room temperature. It would be desirable to have systems and methods for processing the plastic waste so that the amount of additional reactor vessels used for processing is reduced or minimized. In particular, it is desirable to minimize the number of reactor vessels that are dedicated to only handling of plastic waste.

Another difficulty is that plastic waste tends to correspond to a mixture of different types of plastic waste. Plastic waste can commonly include a variety of types of polymers, including polyolefins (e.g., low density polyethylene, high density polyethylene, polypropylene), polyesters, polyethylene terephthalate, polystyrene, and chlorine-containing polymers. The chlorine-containing polymers can include, for example, polyvinyl chloride (PVC), polyvinylidene chloride (PVDC), and PVC that is subsequently further chlorinated to form chlorinated PVC.

The chlorine contained within the polymers can pose challenges for conventional refinery processing equipment. During processing, the chlorine contained within chlorine-containing polymers can be released, resulting in corrosion of reactor vessels, piping, and/or other downstream equipment. Additionally, to the degree chlorides are retained within products after processing, such chlorides may not be compatible with target specifications for an end product. It is noted that weight of chlorine can correspond to a significant portion of the total weight of a chlorine-containing polymer. For example, chlorine corresponds to roughly 57% of the weight of PVC and 73% of the weight of PVDC. Thus, even if the relative amounts of chlorine-containing polymers in a plastic waste feedstock is small, the amount of chlorine released during processing can quickly become substantial.

One conventional option for mitigating the impact of chlorides on downstream equipment, as well as removing the chlorides from potential products, is to add a reaction step for chloride removal. For example, U.S. Patent Application Publication 2019/0062646 describes a method for treating a pyrolysis effluent that was formed by pyrolysis of plastic waste that included chlorine. A feedstock that includes chloride-containing pyrolysis oil is exposed to a catalyst that includes a selected transition metal in the presence of hydrogen to form a hydrotreated liquid product and a gas phase product including HCl. While this can be effective, using a downstream hydroprocessing stage for chloride removal can have several drawbacks. First, hydroprocessing stages represent a large capital investment, and can be costly to operate due to the need to provide elevated temperatures and a hydrogen treat gas for the reaction environment. Additionally, the hydroprocessing stage is downstream from the pyrolysis stage where the chloride-containing pyrolysis oil was formed. This means that at least a portion of the processing system is exposed to the chloride-containing pyrolysis oil prior to the downstream hydroprocessing stage. Finally, the downstream hydroprocessing stage represents the addition of a separate, dedicated stage for chloride removal to a reaction system.

Due to the potential difficulties posed by chlorides for both processing equipment and end products, it would be desirable to have systems and methods for reducing or minimizing the content of chlorides in a feedstock containing plastic waste prior to introducing such a feedstock into a conventional refinery process flow. Additionally, as with handling of the plastic solids, it would be desirable to reduce or minimize the amount of additional reactor vessels used for processing to remove the chlorides. In particular, it would be desirable to minimize the number of reactor vessels that are dedicated to only handling of plastic waste during the chloride removal processing.

U.S. Pat. No. 10,829,696 describes another variation of using a downstream process to handle chloride removal. In U.S. Pat. No. 10,829,696, after performing pyrolysis to generate a chloride-containing hydrocarbon stream, the chloride-containing hydrocarbon stream is passed into a devolatilization extruder along with a zeolitic catalyst and a hydrogen treat gas. While the devolatilization extruder can be located immediately downstream from the pyrolysis stage, the extruder still represents an additional, separate hydroprocessing stage for the purpose of chloride removal.

Chinese Patent CN101230284 describes methods for coking of plastic waste. The plastic waste is pulverized to form small particles. The resulting particles are fluidized using a screw extrusion conveyor, followed by heating and extrusion to convert the plastic waste into a semi-fluid state. The heated and extruded plastic waste is then stored at a temperature of 290° C. to 320° C. to maintain the plastic in a liquid state. The liquid plastic waste is then pumped into the coker furnace, optionally along with a co-feed.

U.S. Pat. No. 9,920,255 describes methods for depolymerization of plastic material. The methods include melting and degassing a plastic feed to form molten plastic. A liquid crude fraction is then added to the molten plastic to reduce the viscosity prior to introducing the mixture of molten plastic and liquid crude into the pyrolysis reactor. It is noted that the plastic is melted and degassed prior to combining the plastic with any conventional co-feed, thus increasing the number of separate reactor vessels needed for integrating the plastic waste with a conventional co-feed.

U.S. Pat. No. 6,861,568 describes a method for performing radical-initiated pyrolysis on plastic waste dissolved in an oil medium. After mixing the plastic waste with oil, the mixture is delivered to a pyrolysis vessel. The pyrolysis temperature is generally described as 300° C.-375° C., although an example is provided of partial reaction at 275° C. Based on the pyrolysis conditions, one of the two primary products is a reactor overhead stream that includes a desired distillate product and a non-condensable overhead gas product. After condensing out the desired distillate product, the remaining overhead gas product can be treated with a water wash in an effort to remove any HCl that may be present. Thus, HCl removal is accomplished using a separate, additional water wash stage.

SUMMARY

In an aspect, a method for co-processing a plastic feedstock is provided. The method includes mixing a plastic feedstock containing plastic particles having an average diameter of 10 cm or less with one or more additional feedstocks to form a feedstock mixture. The plastic feedstock can include a chlorine-containing polymer. The feedstock mixture can include 1.0 wt % to 50 wt % of the plastic feedstock relative to a weight of the feedstock mixture. The one or more additional feedstocks can have a T5 distillation point that is greater than a dechlorination temperature of 170° C. to 250° C. The method can further include maintaining the feedstock mixture in a vessel at the dechlorination temperature for 1.0 minute to 240 minutes to form a dechlorinated mixture of feedstocks. The method can further include passing a purge stream comprising a purge gas through the vessel to form a purge exhaust stream containing at least a portion of the purge gas. Additionally, the method can include processing the dechlorinated mixture of feedstocks in a co-processing stage for conversion of at least a portion of the dechlorinated mixture of feedstocks to form a conversion effluent.

In another aspect, a method for co-processing a plastic feedstock is provided. The method includes mixing a plastic feedstock comprising plastic particles having an average diameter of 10 cm or less with one or more additional feedstocks to form a feedstock mixture. The plastic feedstock can include a chlorine-containing polymer. The feedstock mixture can include 1.0 wt % to 50 wt % of the plastic feedstock relative to a weight of the feedstock mixture. The one or more additional feedstocks can have a T10 distillation point (or optionally a T5 distillation point) that is greater than a dechlorination temperature of 170° C. to 300° C. The method can further include maintaining the feedstock mixture in a vessel at the dechlorination temperature for 1.0 minute to 240 minutes to form a dechlorinated mixture of feedstocks. The method can further include passing a purge stream comprising a purge gas through the vessel to form a purge exhaust stream comprising at least a portion of the purge gas. Additionally, the method can include processing the dechlorinated mixture of feedstocks in a co-processing stage for conversion of at least a portion of the dechlorinated mixture of feedstocks to form a conversion effluent. The processing conditions can include a) a temperature of 475° C. or higher, b) a temperature that is greater than the dechlorination temperature by 200° C. or more, or c) a combination of a) and b).

In still another aspect, a system for co-processing of a plastic feedstock is provided. The system can include a physical processing stage including a plastic inlet and a physically processed plastic outlet. The system can further include a mixing vessel including a plastic feedstock inlet, at least one additional feedstock inlet, a purge gas inlet, a purge exhaust, and a dechlorinated feedstock outlet. The plastic feedstock inlet can be in solids flow communication with the physically processed plastic outlet. Additionally, the method can include at least one of a fluid catalytic cracking stage and a pyrolysis stage in fluid communication with the dechlorinated feedstock outlet.

DETAILED DESCRIPTION

Figure 1:
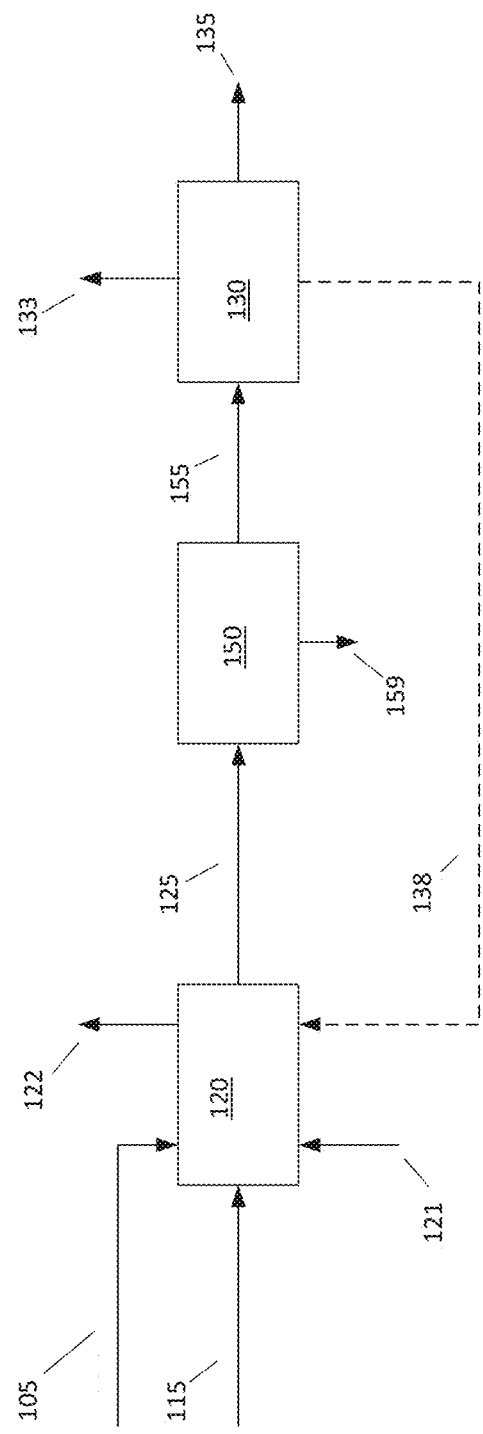
FIG. 1 shows an example of a process configuration for dechlorination of a feedstock mixture prior to co-processing in a coking stage.

All numerical values within the detailed description and the claims herein are modified by "about" or "approximately" the indicated value, and take into account experimental error and variations that would be expected by a person having ordinary skill in the art.

In various aspects, systems and methods are provided for reducing or minimizing the chloride content of products generated during co-processing of a plastic feedstock (such as plastic waste) in a refinery process. The reduction in chloride is achieved by mixing the plastic feedstock with one or more additional feedstocks for co-processing in a mixing and/or holding vessel that is maintained at a dechlorination temperature that allows for decomposition of chlorine from the plastic feedstock to form HCl, while reducing or minimizing other conversion of the plastic feedstock and/or the additional feedstock. A purge gas can be passed through the mixing/holding vessel to remove the evolved HCl from the vessel. Because the dechlorination temperature is selected to reduce or minimize conversion of the feedstocks in the mixture, the amount of carbon-containing products that are removed with the purge gas can be reduced or minimized. The dechlorinated mixture of plastic feedstock and additional feedstock(s) can then be processed in a convenient refinery process, such as a thermal cracking process (e.g., coking, visbreaking, other types of pyrolysis) or a catalytic conversion process (e.g., fluid catalytic cracking).

Polyvinyl chloride (PVC) is a common type of industrial plastic that includes chlorine. Due to stabilizers included in commercial polymer formulations, direct thermal degradation of PVC alone can require temperatures of up to 250° C. However, it has been unexpectedly discovered that substantial dechlorination of polymer waste containing PVC (and/or other chloride-containing plastic) can be performed at temperatures of 170° C. to 250° C. if the polymer waste is solubilized in an additional feedstock for co-processing.

Based on the above, performing dechlorination by mixing plastic waste (or more generally, a plastic feedstock) with a co-feedstock at temperatures of 170° C. to 250° C. while purging the vessel where the mixing occurs can provide a variety of advantages. First, the dechlorination can be performed in a vessel for mixing the plastic feedstock and the additional feedstock. Such a mixing vessel is typically included in a co-processing system, so an extra reactor is not required to perform the dechlorination. Second, by performing the dechlorination at a temperature of 250° C. or less, the dechlorination can be accomplished while reducing or minimizing the amount of volatile organic compounds (such as light ends or low boiling naphtha compounds) that are formed during the dechlorination process. By substantially avoiding the formation of low boiling compounds other than HCl, the HCl can be removed from the dechlorination environment while reducing or minimizing incorporation of carbon-containing compounds into the purge exhaust stream from the dechlorination environment. This can avoid the need to process the purge exhaust stream, which contains HCl, in order to recover desirable carbon-containing products. Additionally, performing the dechlorination in the mixing vessel means that the chlorides are removed prior to co-processing, thus reducing or minimizing the potential for corrosion of downstream equipment.

It is noted that it may be possible to perform the dechlorination of the plastic feedstock with the one or more additional feedstocks in a vessel at a dechlorination temperature of greater than 250° C. For example, the dechlorination temperature could be up to 300° C. or possibly still higher. However, using a dechlorination temperature of greater than 250° C. can reduce or minimize one of the benefits performing the dechlorination prior to co-processing. In particular, one of the difficulties with performing dechlorination after co-processing is that the resulting chlorine species that are evolved during dechlorination (such as HCl) are mixed with other carbon-containing products. While HCl can be separated from products in the purge gas exhaust, needing to separate desired carbon-containing products from HCl means that an increased number of components in the reaction system will be exposed to the potentially corrosive effects of the HCl. Performing the dechlorination in a vessel prior to co-processing can reduce or minimize this difficulty by reducing or minimizing the amount of carbon-containing products that might be entrained with the HCl in the purge gas exhaust. Using a dechlorination temperature of 250° C. or less assists with this valuable feature, as using a low dechlorination temperature can reduce or minimize the amount of decomposition of the one or more additional feedstocks during dechlorination.

Without being bound by any particular theory, it is believed that as temperatures greater than 250° C. are used during dechlorination, it becomes increasingly likely that radicals formed during dechlorination will result in substantial conversion of the one or more additional feedstocks, resulting in generation of naphtha boiling range compounds and/or light ends that are volatile at the dechlorination temperature. If such naphtha and/or light ends compounds become entrained in the purge gas exhaust, either the yield will be decreased (if the compounds are not recovered from the purge gas exhaust) or a new, separate process train will be needed for the purge gas exhaust, with the corresponding increase in the number of components in the processing system that are exposed to the corrosive properties of the purge gas exhaust. Maintaining a dechlorination temperature of 250° C. or less allows the loss of carbon-containing products in the purge gas exhaust to be reduced or minimized, and thereby simplifies the handling of the potentially corrosive purge gas exhaust.

Although maintaining a dechlorination temperature of 250° C. or less can be beneficial, using a higher dechlorination temperature can still provide some advantages. For example, using a dechlorination temperature of 250° C. to 300° C. can increase the rate of chlorine removal from the mixture of feedstocks. Although it is possible that dechlorination temperatures of 250° C. to 300° C. may cause some additional conversion of the one or more additional feedstocks, this increased rate of chlorine removal can reduce residence times, thereby potentially increasing the volume of the feedstock mixture that can be processed within a system. In aspects where increasing the dechlorination temperature is desirable, the dechlorination temperature is desirable, the dechlorination temperature can range from 170° C. to 300° C., or 200° C. to 300° C., or 250° C. to 300° C., or 170° C. to 280° C., or 200° C. to 280° C., or 250° C. to 280° C.

After performing the dechlorination, the dechlorinated mixture can then be passed into another type of feedstock conversion process. In some aspects, the additional type of feedstock conversion process can be performed at a temperature of 450° C. or higher, or 475° C. or higher, or 500° C. or higher, such as up to 650° C. or possibly still higher. Additionally or alternately, the temperature in the additional type of feedstock conversion process can be performed at a temperature that is higher than the dechlorination temperature by 200° C. or more, or 225° C. or more, such as up to 550° C. higher than the dechlorination temperature (or possibly higher still).

Plastic Feedstock

In some aspects, a plastic feedstock for co-processing can include or consist essentially of one or more types of polymers, such as polymers corresponding to plastic waste. The systems and methods described herein can be suitable for processing plastic waste corresponding to a single type of olefinic polymer and/or plastic waste corresponding to a plurality of olefinic polymers. In aspects where the plastic feedstock consists essentially of polymers, the feedstock can include one or more types of polymers as well as any additives, modifiers, packaging dyes, and/or other components typically added to a polymer during and/or after formulation. The feedstock can further include any components typically found in polymer waste.

Plastic feedstocks may be obtained from various sources, including plastic from various sorted and unsorted sources. For example, the plastic feedstock may be obtained from municipal sources or industrial sources, including industrial scraps and off-spec materials.

In various aspects, the plastic feedstock can include chlorides, such as chlorides one or more chlorine-containing polymers or other sources (including from polymerizations catalysts and additives such as plasticizers). Examples of chlorine-containing polymers including PVC (polyvinyl chloride) and PVDC (polyvinylidene chloride). In some aspects, substantially all of the plastic feedstock can correspond to chlorine-containing polymers. More generally, the chlorine-containing polymers can correspond to 0.001 wt % to 100 wt % of the plastic feedstock, or 0.001 wt % to 50 wt %, or 10 wt % to 100 wt %, or 10 wt % to 50 wt %, or 25 wt % to 100 wt %, or 25 wt % to 50 wt %. In some aspects, the chlorine-containing polymers can correspond to a smaller portion of the total plastic feedstock, such as 0.001 wt % to 15 wt % of the plastic feedstock (relative to the weight of the plastic feedstock), or 0.1 wt % to 15 wt %, or 1.0 wt % to 15 wt %, or 0.001 wt % to 10 wt %, or 0.1 wt % to 10 wt %, or 1.0 wt % to 10 wt %, or 0.001 wt % to 5.0 wt %, or 0.001 wt % to 1.0 wt %.

In some aspects, the polymer feedstock can include at least one of polyethylene and polypropylene. The polyethylene can correspond to any convenient type of polyethylene, such as high density or low density versions of polyethylene. Similarly, any convenient type of polypropylene can be used. Additionally or alternately, the plastic feedstock can include one or more of polystyrene, polyamide (e.g., nylon), polyethylene terephthalate, and ethylene vinyl acetate. Still other polyolefins can correspond to polymers (including co-polymers) of butadiene, isoprene, and isobutylene. In some aspects, the polyethylene and polypropylene can be present in the mixture as a co-polymer of ethylene and propylene. More generally, the polyolefins can include co-polymers of various olefins, such as ethylene, propylene, butenes, hexenes, and/or any other olefins suitable for polymerization.

In this discussion, unless otherwise specified, weights of polymers in a feedstock correspond to weights relative to the total polymer content in the feedstock. Any additives and/or modifiers and/or other components included in a formulated polymer are included in this weight. However, the weight percentages described herein exclude any solvents or carriers that might optionally be used to facilitate transport of the polymer into the initial pyrolysis stage.

In some aspects, the plastic feedstock can include 0.01 wt % to 35 wt % of polystyrene, or 0.1 wt % to 35 wt %, or 1.0 wt % to 35 wt %, or 0.01 wt % to 20 wt %, or 0.1 wt % to 20 wt %, or 1.0 wt % to 20 wt %, or 10 wt % to 35 wt %, or 5 wt % to 20 wt %. In some aspects, the plastic feedstock can optionally include 0.1 wt % to 1.0 wt % polyamide.

In various aspects, the plastic waste can be prepared for introduction as a plastic feedstock for co-processing by using one or more physical processes to convert the plastic feedstock into particles and/or to reduce the particle size of the plastic particles.

For a plastic feedstock that is not initially in the form of particles, a first processing step can be a step to convert the plastic feedstock into particles and/or to reduce the particle size. This can be accomplished using any convenient type of physical processing, such as chopping, crushing, grinding, shredding or another type of physical conversion of plastic solids into particles. It is noted that it may be desirable to convert plastic into particles of a first average and/or median size, followed by additional physical processing to reduce the size of the particles.

Having a small particle size can facilitate solvation of the plastic particles and/or distribution of plastic particles within a slurry in a desirable time frame. Thus, physical processing can optionally be performed to reduce the median particle size of the plastic particles to 10 cm or less, or 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

Additional Feedstocks and Forming Dechlorinated of Mixture of Feedstocks

In various aspects, a dechlorinated mixture of feedstocks for co-processing can be formed by mixing a plastic feedstock with one or more additional feedstocks in a mixing vessel to form a feedstock mixture. The feedstock mixture can then be maintained at a dechlorination temperature to allow for dechlorination of the feedstock mixture (and thereby forming the dechlorinated mixture of feedstocks) prior to performing the co-processing. The one or more additional feedstocks can include any type of conventional feed appropriate for the type of co-processing, such as mineral feeds that are suitable for coking, fluid catalytic cracking, or another type of co-processing.

To form the feedstock mixture, the plastic particles of the plastic feedstock can be mixed with the one or more additional feedstocks. In some aspects, the plastic feedstock can correspond to 1.0 wt % to 50 wt % of the total weight of the feedstock mixture, or 1.0 wt % to 30 wt %, or 1.0 wt % to 15 wt %, or 5.0 wt % to 50 wt %, or 5.0 wt % to 30 wt %, or 5.0 wt % to 15 wt %, or 10 wt % to 50 wt %, or 10 wt % to 30 wt %. This will usually result in formation of a solution of the plastic feedstock in the one or more additional feedstocks.

The mixing can be performed in a mixing vessel. After mixing, the feedstock mixture can be maintained at a dechlorination temperature of 170° C. to 250° C. or 190° C. to 250° C. or 170° C. to 230° C. or 190° C. to 230° C. or 170° C. to 210° C. Optionally, in some aspects, a higher dechlorination temperature can be used, corresponding to a temperature of up to 280° C. or up to 300° C. The feedstock mixture can be maintained at the dechlorination temperature for a sufficient period of time to allow for dechlorination. Depending on the aspect, the feedstock mixture can be maintained at the dechlorination temperature for 1.0 minute to 240 minutes, or 1.0 minute to 120 minutes, or 1.0 minute to 60 minutes, or 5.0 minutes to 240 minutes, or 5.0 minutes to 120 minutes, or 5.0 minutes to 60 minutes, or 10 minutes to 240 minutes, or 10 minutes to 120 minutes, or 10 minutes to 60 minutes, or 1.0 minute to 30 minutes. It is noted that in a continuous or semi-continuous process, the average residence time for the feedstock mixture in the mixing vessel is defined herein as the amount of time that the feedstock mixture is maintained at the dechlorination temperature prior to leaving the vessel as part of the dechlorinated mixture of feedstocks. It is noted that the plastic feedstock and the one or more additional feedstocks can be initially mixed at the dechlorination temperature, or the mixing temperature for mixing the feedstocks can be different from the dechlorination temperature. If the mixing temperature is different from the dechlorination temperature, the feedstock mixture can be heated to the dechlorination temperature and maintained at the dechlorination temperature for the desired period of time. Although it would be possible to mix the feedstocks at a temperature greater than the dechlorination temperature, this is generally less preferable, as if the mixing temperature is greater than 250° C. additional undesired conversion of the one or more additional feedstocks could potentially occur in the time period between when mixing first occurs and when the feedstock mixture is cooled to the dechlorination temperature.

In some aspects, the feedstock mixture can be maintained at the dechlorination temperature for a sufficient period of time so that the resulting dechlorinated mixture of feedstocks is substantially dechlorinated. In this discussion, a substantially dechlorinated feed is defined as a feed that includes 0.005 wt % or less of chlorine (relative to the weight of the dechlorinated feed), as determined by elemental analysis, such as down to having no chlorine content within detection limit. For example, the total chlorides in a sample can be measured using combustion ion chromatography according to ASTM D7359. In other aspects, the feedstock mixture can be maintained at the dechlorination temperature until the dechlorinated mixture contains 2500 wppm or less of chlorine, or 1000 wppm or less of chlorine, or 500 wppm or less of chlorine, or 100 wppm or less of chlorine, such as down to having substantially no chlorine content within detection limit. In still other aspects, the amount of chlorine remaining in the dechlorinated mixture of feedstocks can correspond to 20 wt % or less of the original weight of chlorine in the feedstock mixture, or 10 wt % or less, or 5.0 wt % or less, or 1.0 wt % or less, such as down to 0.01 wt % of the original weight of chlorine in the feedstock mixture, or possibly still lower.

During and/or after mixing, a purge gas can be passed through the feedstock mixture to remove HCl that is formed while maintaining the feedstock mixture at the temperature between 170° C. to 250° C. (or alternatively 170° C. and 300° C.). The purge gas and HCl can exit from the mixing vessel as a purge exhaust stream. Preferably, the purge gas can be passed into the same vessel that is used for maintaining the feedstock mixture at the temperature of 170° C. to 250° C. (or alternatively 170° C. to 300° C.). In some alternative aspects, the feedstocks can be mixed and/or maintained at a temperature of 170° C. to 250° C. (or alternatively 170° C. to 300° C.) in one or more vessels, and then passed into a separate vessel or conduit where the purge gas is used to remove the HCl.

Generally, the one or more additional feedstocks can have a T5 distillation point and/or an initial boiling point that is greater than the dechlorination temperature during the dechlorination process. Additionally or alternately, the one or more additional feedstocks can have a T5 distillation point of 250° C. or more, or 260° C. or more, or 270° C. or more, or 300° C. or more, such as having a T5 distillation point of up to 500° C. or possibly still higher. Further additionally or alternately, the one or more additional feedstocks can have an initial boiling point of 250° C. or more, or 260° C. or more, or 270° C. or more, or 300° C. or more, such as having an initial boiling point of up to 500° C. or possibly still higher. By having a sufficiently high T5 distillation point and/or initial boiling point for the one or more additional feedstocks, the amount of the feedstock mixture that becomes part of the purge exhaust stream can be reduced or minimized. It is noted that in some optional aspects where the dechlorination temperature is potentially allowed to be greater than 250° C., the one or more additional feedstocks can have a T10 distillation point that is greater than the dechlorination temperature.

The purge gas can correspond to a sufficient amount of purge gas to remove HCl as it evolves during the dechlorination process. Additionally or alternately, the purge gas can assist with mixing of the plastic feedstock and the one or more additional feedstocks in the vessel, which can facilitate complete dissolution of the plastic feedstock. Examples of suitable rates of purge gas flow can range from 10,000 standard cubic feet of purge gas per metric ton of chlorinated polymer to 2,000,000 standard cubic feet of purge gas per metric ton of chlorinated polymer. This can alternatively be written as 10-2000 kSCF purge gas/metric ton chlorinated polymer. Any convenient gas can be used as the purge gas. To minimize cost, a gas such as nitrogen or steam can be a suitable choice. Other purge gas choices can correspond to light refinery or process gas flows, such as a light ends stream (i.e., a $C_4$-stream) from a refinery process. Preferably, the purge gas can include a reduced or minimized amount of contaminants, such as $NH_3$ or $H_2S$, or can be substantially free of such contaminants. The purge gas can then leave the mixing vessel (and/or other separate vessel) as a purge exhaust stream that includes at least purge gas and HCl generated during dechlorination. After dechlorination, the remaining liquid product in the mixing vessel can leave a dechlorinated mixture of feedstocks that is then passed into a co-processing stage.

In some aspects, the temperature in the mixing vessel can be selected so that a reduced or minimized amount of formation occurs of volatile (organic) products different from HCl. In the mixing vessel, volatile organic compounds can correspond to compounds (such as light gases and/or naphtha boiling range compounds) that have a boiling point below the dechlorination temperature (i.e., lower than 170° C.-250° C.). In particular, the amount of light gases and/or naphtha boiling range compounds formed in the mixing vessel during dechlorination that boil at less than the dechlorination temperature can be reduced or minimized. In some aspects, conversion of the one or more additional feedstocks in the mixing vessel can be sufficiently low so that 5.0 wt % or less of organic compounds are formed that boil at temperatures lower than the dechlorination temperature (relative to a weight of the feedstock mixture), or 3.0 wt % or less, or 1.0 wt % or less, such as down to forming substantially no organic compounds that boil at a temperature lower than the dechlorination temperature. Reducing or minimizing the formation of volatile organic compounds is beneficial because any volatile organic species formed in the mixing vessel will have a tendency to by removed from the mixing vessel by the purge gas as part of the purge exhaust stream, along with the HCl. This means that recovery of such organic compounds as products requires decontamination of the purge exhaust from the mixing vessel. In aspects where a separate vessel or conduit is used for exposing the feedstock mixture to the purge gas, the temperature of the mixture in the separate vessel or conduit can also be maintained at a temperature of 170° C. to 250° C. to reduce or minimize formation of volatile organic products that would also be removed by the purge gas as part of the purge exhaust.

In some alternative aspects, if it is desired to recover organic compounds from the purge exhaust, it is noted that contaminant removal can be performed on the purge exhaust stream in order to recover the volatile organic products. The optional contaminant removal on the purge exhaust stream can be performed by any convenient method. For example, a conventional amine wash (amine dissolved in water) can be used to remove the HCl from the purge exhaust stream.

The pressure in the mixing vessel during dechlorination can be any convenient pressure. In some aspects, a pressure greater than 100 kPa-a can be used to further assist with reducing or minimizing the amount of volatile organic products that exit from the mixing vessel as part of the purge gas. In such aspects, the pressure in the mixing vessel during the dechlorination process can be 150 kPa-a to 1000 kPa-a.

It is noted that after dechlorination, the dechlorinated mixture of feedstocks can optionally be combined with additional supplemental conventional feedstock(s) that are suitable for introduction into the co-processing stage. Additionally or alternately, if recycle of products from the co-processing stage is used, at least a portion of the recycle stream can be added to the dechlorinated mixture of feedstocks as a supplemental feedstock. In such aspects, after addition of the additional conventional feedstocks and/or recycle stream, the chlorine content of the resulting mixture can be 1000 wppm or less, or 500 wppm or less, or 100 wppm or less, or 50 wppm or less, such as down to having no chlorine content within detection limit.

In aspects where additional feedstocks and/or recycle is not added after dechlorination, it is preferable for the dechlorinated mixture to contain 1000 wppm or less of chlorine after dechlorination, or 500 wppm or less, or 100 wppm or less, or 50 wppm or less, such as down to no chlorine content within detection limit.

In various aspects, at least one of the additional feedstocks can correspond to a conventional type of feedstock based on the type of subsequent processing that will be performed. For example, if the co-processing corresponds to coking, the plastic feedstock can be mixed with at least one conventional coking feedstock. Similarly, if the co-processing corresponds to fluid catalytic cracking (FCC), the plastic feedstock can be mixed with at least one conventional FCC feedstock. Optionally, a portion of the one or more additional feedstocks can correspond to a recycle stream from the co-processing. For example, a portion of heavy product and/or unconverted product from the co-processing can be recycled for combination with the one or more additional feedstocks and/or the plastic feedstock and/or the feedstock mixture. When recycle is used, the recycle stream can correspond to 1.0 wt % to 50 wt % of the total weight of the feedstock mixture.

As still another option, in some alternative aspects, the "co-processing" stage can be a pyrolysis stage where a sufficient portion of the liquid product from the "co-processing" stage is recycled to allow for dissolution of the plastic feedstock in the recycled liquid product. In this type of configuration, the one or more additional feedstocks can actually correspond to the recycled portion of the liquid product. In such aspects, a pyrolysis stage can be used for the "co-processing". In such aspects, some type of mineral feed and/or other separate feed may be needed to initially start the pyrolysis process, as some type of liquid co-feed is needed to dissolve the fresh plastic feed particles in the mixing vessel. Once a sufficient amount of recycled liquid product becomes available, the amount of mineral feed and/or other separate feed can be reduced, minimize, or possibly eliminated. This can allow for steady state processing of a plastic feed using a "co-feed" that corresponds to the recycled liquid product from pyrolysis of the plastic feed. In aspects where a recycle steam corresponds to substantially all of the one or more additional feeds included in the feedstock mixture, the recycle stream can correspond to at least 50 wt % of the feedstock mixture.

One option for performing co-processing on a feedstock mixture is to use some type of thermal cracking or pyrolysis. Coking, visbreaking, or other types of pyrolysis are examples of thermal cracking processes that can be used to co-process a feed corresponding to a mixture of a plastic feedstock and one or more additional feedstocks.

In aspects where the co-processing corresponds to thermal cracking or pyrolysis, a conventional coker feedstock is an example of a suitable type of feedstock for use as at least one of the additional feedstocks. A conventional coker feedstock can correspond to one or more types of petroleum and/or renewable feeds with a suitable boiling range for processing in a coker. In some aspects, the coker feedstock for co-processing can correspond to a relatively high boiling fraction, such as a heavy oil feed. For example, the coker feedstock portion of the feed can have a T10 distillation point of 343° C. or more, or 371° C. or more. Examples of suitable heavy oils for inclusion in the coker feedstock include, but are not limited to, reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from 5 to 50 wt. %. In some preferred aspects, the feed is a petroleum vacuum residuum.

Some examples of conventional petroleum chargestock suitable for processing in a delayed coker or fluidized bed coker can have a composition and properties within the ranges set forth below in Table 1.

TABLE 1

| Example of Coker Feedstock | | |
|---|---|---|
| Conradson Carbon | 5 to 40 | wt. % |
| API Gravity | −10 to 35° | |

TABLE 1-continued

| Example of Coker Feedstock | | |
|---|---|---|
| Boiling Point | 340° C.+ to 650° C.+ | |
| Sulfur | 1.5 to 8 | wt. % |
| Hydrogen | 9 to 11 | wt. % |
| Nitrogen | 0.2 to 2 | wt. % |
| Carbon | 80 to 86 | wt. % |
| Metals | 1 to 2000 | wppm |

In addition to petroleum chargestocks, renewable feedstocks derived from biomass having a suitable boiling range can also be used as part of the coker feed. Such renewable feedstocks include feedstocks with a T10 boiling point of 340° C. or more and a T90 boiling point of 600° C. or less. An example of a suitable renewable feedstock derived from biomass can be a pyrolysis oil feedstock derived at least in part from biomass.

Another option for co-processing a feedstock mixture is to use a catalytic cracking process. Fluid catalytic cracking is an example of a catalytic cracking process that can be used for such co-processing.

A wide range of petroleum and chemical feedstocks can be used directly as an FCC input feed and/or hydroprocessed to form an FCC input feed. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, extracts, slack waxes, Fischer-Tropsch waxes, raffinates, and mixtures of these materials.

Suitable feeds for use as an FCC input feed and/or for hydroprocessing to form an FCC input feed can include, for example, feeds with an initial boiling point and/or a T5 boiling point and/or T10 boiling point of at least ~600° F. (~316° C.), or at least ~650° F. (~343° C.), or at least ~700° F. (371° C.), or at least ~750° F. (~399° C.). Additionally or alternately, the final boiling point and/or T95 boiling point and/or T90 boiling point of the feed can be ~1100° F. (~593° C.) or less, or ~1050° F. (~566° C.) or less, or ~1000° F. (~538° C.) or less, or ~950° F. (~510° C.) or less. In particular, a feed can have a T5 to T95 boiling range of ~316° C. to ~593° C., or a T5 to T95 boiling range of ~343° C. to ~566° C., or a T10 to T90 boiling range of ~343° C. to ~566° C. Optionally, it can be possible to use a feed that includes a lower boiling range portion. Such a feed can have an initial boiling point and/or a T5 boiling point and/or T10 boiling point of at least ~350° F. (~177° C.), or at least ~400° F. (~204° C.), or at least ~450° F.(~232° C.). In particular, such a feed can have a T5 to T95 boiling range of ~177° C. to ~593° C., or a T5 to T95 boiling range of ~232° C. to ~566° C., or a T10 to T90 boiling range of ~177° C. to ~566° C.

In some aspects, the FCC input feed and/or the feed for hydroprocessing to form an FCC input feed can have a sulfur content of ~500 wppm to ~50000 wppm or more, or ~500 wppm to ~20000 wppm, or ~500 wppm to ~10000 wppm. Additionally or alternately, the nitrogen content of such a feed can be ~20 wppm to ~8000 wppm, or ~50 wppm to ~4000 wppm. In some aspects, the feed can correspond to a "sweet" feed, so that the sulfur content of the feed can be ~10 wppm to ~500 wppm and/or the nitrogen content can be ~1 wppm to ~100 wppm.

In some aspects, prior to FCC processing, a feedstock for co-processing can be hydrotreated. An example of a suitable type of hydrotreatment can be hydrotreatment under trickle bed conditions. Hydrotreatment can be used, optionally in conjunction with other hydroprocessing, to form an input feed for FCC processing based on an initial feed.

Hydroprocessing (such as hydrotreating) can be carried out in the presence of hydrogen. A hydrogen stream can be fed or injected into a vessel or reaction zone or hydroprocessing zone corresponding to the location of a hydroprocessing catalyst. Hydrogen, contained in a hydrogen "treat gas." can be provided to the reaction zone. Treat gas, as referred to herein, can be either pure hydrogen or a hydrogen-containing gas stream containing hydrogen in an amount that for the intended reaction(s). Treat gas can optionally include one or more other gasses (e.g., nitrogen and light hydrocarbons such as methane) that do not adversely interfere with or affect either the reactions or the products. Impurities, such as $H_2S$ and $NH_3$ are undesirable and can typically be removed from the treat gas before conducting the treat gas to the reactor. In aspects where the treat gas stream can differ from a stream that substantially consists of hydrogen (i.e., at least 99 vol % hydrogen), the treat gas stream introduced into a reaction stage can contain at least 50 vol %, or at least 75 vol % hydrogen, or at least 90 vol % hydrogen.

During hydrotreatment, a feedstock can be contacted with a hydrotreating catalyst under effective hydrotreating conditions which include temperatures in the range of 450° F. to 800° F. (~232° C. to ~427° C.), or 550° F. to 750° F. (~288° C. to ~399° C.); pressures in the range of 1.5 MPag to 20.8 MPag (~200 to ~3000 psig), or 2.9 MPag to 13.9 MPag (~400 to ~2000 psig); a liquid hourly space velocity (LHSV) of from 0.1 to 10 $hr^{-1}$, or 0.1 to 5 $hr^{-1}$; and a hydrogen treat gas rate of from 430 to 2600 $Nm^3/m^3$ (~2500 to ~15000 SCF/bbl), or 850 to 1700 $Nm^3/m^3$ (~5000 to ~10000 SCF/bbl).

In an aspect, the hydrotreating step may comprise at least one hydrotreating reactor, and optionally may comprise two or more hydrotreating reactors arranged in series flow. A vapor separation drum can optionally be included after each hydrotreating reactor to remove vapor phase products from the reactor effluent(s). The vapor phase products can include hydrogen. $H_2S$. $NH_3$, and hydrocarbons containing four (4) or less carbon atoms (i.e., "$C_4$-hydrocarbons"). Optionally, a portion of the $C_3$ and/or $C_4$ products can be cooled to form liquid products. The effective hydrotreating conditions can be suitable for removal of at least about 70 wt %, or at least about 80 wt %, or at least about 90 wt % of the sulfur content in the feedstream from the resulting liquid products. Additionally or alternately, at least about 50 wt %, or at least about 75 wt % of the nitrogen content in the feedstream can be removed from the resulting liquid products. In some aspects, the final liquid product from the hydrotreating unit can contain less than about 1000 ppmw sulfur, or less than about 500 ppmw sulfur, or less than about 300 ppmw sulfur, or less than about 100 ppmw sulfur.

The effective hydrotreating conditions can optionally be suitable for incorporation of a substantial amount of additional hydrogen into the hydrotreated effluent. During hydrotreatment, the consumption of hydrogen by the feed in order to form the hydrotreated effluent can correspond to at least 1500 SCF/bbl (~260 $Nm^3/m^3$) of hydrogen, or at least 1700 SCF/bbl (~290 $Nm^3/m^3$), or at least 2000 SCF/bbl (~330 $Nm^3/m^3$), or at least 2200 SCF/bbl (~370 $Nm^3/m^3$), such as up to 5000 SCF/bbl (~850 $Nm^3/m^3$) or more. In particular, the consumption of hydrogen can be 1500 SCF/bbl (~260 $Nm^3/m^3$) to 5000 SCF/bbl (~850 $Nm^3/m^3$), or 2000 SCF/bbl (~340 $Nm^3/m^3$) to 5000 SCF/bbl (~850 $Nm^3/m^3$), or 2200 SCF/bbl (~370) $Nm^3/m^3$) to 5000 SCF/bbl (~850 $Nm^3/m^3$).

Hydrotreating catalysts suitable for use herein can include those containing at least one Group VIA metal and at least one Group VIII metal, including mixtures thereof. Examples of suitable metals include Ni, W, Mo, Co and mixtures thereof, for example CoMo, NiMoW, NiMo, or NiW. These metals or mixtures of metals are typically present as oxides or sulfides on refractory metal oxide supports. The amount of metals for supported hydrotreating catalysts, either individually or in mixtures, can range from ~0.5 to ~35 wt %, based on the weight of the catalyst. Additionally or alternately, for mixtures of Group VIA and Group VIII metals, the Group VIII metals can be present in amounts of from ~0.5 to ~5 wt % based on catalyst, and the Group VIA metals can be present in amounts of from 5 to 30 wt % based on the catalyst. A mixture of metals may also be present as a bulk metal catalyst wherein the amount of metal can comprise ~30 wt % or greater, based on catalyst weight. Suitable metal oxide supports for the hydrotreating catalysts include oxides such as silica, alumina, silica-alumina, titania, or zirconia. Examples of aluminas suitable for use as a support can include porous aluminas such as gamma or eta.

In this discussion, a reference to a "$C_x$" fraction, stream, portion, feed, or other quantity is defined as a fraction (or other quantity) where 50 wt % or more of the fraction corresponds to hydrocarbons having "x" number of carbons. When a range is specified, such as "$C_x$-$C_y$", 50 wt % or more of the fraction corresponds to hydrocarbons having a number of carbons between "x" and "y". A specification of "$C_{x+}$" (or "$C_{x-}$") corresponds to a fraction where 50 wt % or more of the fraction corresponds to hydrocarbons having the specified number of carbons or more (or the specified number of carbons or less).

In this discussion, the naphtha boiling range is defined as 30° C. (roughly the boiling point of $C_5$ alkanes) to 177° C. The distillate boiling range is defined as 177° C. to 350° C. The vacuum gas oil boiling range is defined as 350° C. to 565° C. The resid boiling range is defined as 565° C.+. A fraction that is referred to as corresponding to a boiling range is defined herein as a fraction where 80 wt % or more (or 90 wt % or more, such as up to 100 wt %) of the fraction boils within the specified boiling range. Thus, a naphtha boiling range fraction is a fraction where 80 wt % or more (or 90 wt % or more) of the fraction boils within the naphtha boiling range. A fraction corresponding to a naphtha plus distillate fraction can have 80 wt % or more (or 90 wt % or more) of compounds that boil between 30° C. and 350° C. A fraction corresponding to vacuum gas oil plus resid can include 80 wt % or more (or 90 wt % or more) of compounds with a boiling point of 350° C. or more.

Addition of Oxygen and/or Decomposition Additives

Optionally, a source of oxygen can also be introduced into the vessel containing the feedstock mixture. Including a source of oxygen in the environment containing the feedstock mixture can further facilitate dechlorination of the feedstock mixture while reducing or minimizing the formation of volatile carbon-containing products.

In aspects where oxygen is introduced into the dechlorination environment, the oxygen can be in the form of a gas phase stream that includes $O_2$; or the oxygen can be part of one of the one or more additional feedstocks, such as a feedstock derived from biomass that has an oxygen content of 1.0 wt % or more relative to the weight of the feedstock derived from biomass; or the oxygen can be introduced in the form of particles of biomass that are included with the plastic feedstock. In aspects where the oxygen is in the form of a gas phase stream that includes $O_2$, the oxygen can be introduced as part of the purge gas. Without being bound by any particular theory, it is believed that having an oxygen source present in the vessel with the feedstock mixture can further facilitate formation and/or propagation of radicals that assists with decomposition of chlorine-containing polymers to form HCl. Any convenient amount of the oxygen source can be used. If it is desired to select the amount of the source of oxygen based on the reaction conditions, one option would be to use a multiple of the stoichiometric amount of oxygen needed to match the molar amount of chlorine in the mixture of feedstocks. For example, the amount of oxygen delivered into the reaction environment can correspond to 0.1-10 times the molar amount of chlorine present in the feedstock, or 1.0-10 times the molar amount of chlorine.

In some aspects, an additional feedstock can include a biomass-derived feedstock that is more difficult to process, such as a feedstock corresponding to particles of solid biomass or a pyrolysis oil derived from biomass. In such aspects, the combined amount of plastic feedstock and the biomass-derived feedstock can correspond to 1.0 wt % to 30 wt % of the total mixture of feedstocks, or 1.0 wt % to 20 wt %, or 5.0 wt % to 30 wt %, or 5.0 wt % to 20 wt %, or 10 wt % to 30 wt %. It is noted that such biomass-derived feedstocks can correspond to oxygen-containing feedstocks. In other aspects, an additional feedstock can include other types of oxygen-containing feedstocks, such as FAME or various types of vegetable oil. In such aspects, so long as the boiling range is appropriate, any convenient amount of the oxygen-containing feedstock can be included as part of the feedstock mixture.

Additionally or alternately, one or more additives can be included in the mixture of feedstocks to facilitate decomposition of chlorides in the plastic feedstock during dechlorination. Some additives can correspond to reagent additives, such as calcium oxide or iron stearate. Such reagent additives can tend to operate as reagents, so that the enhancement of chloride removal is based on reaction of the additive with chlorine from the plastic feedstock. This results in consumption of the reagent additive as chlorine is removed. Examples of reagent additives include, but are not limited to, CaO, iron stearate, $CaCO_3$, $NaCO_3$, mixtures of $NaCO_3$ and $Al_2O_3$, and combinations thereof. Other additives can correspond to additives that can facilitate decomposition reactions that occur along radical reaction pathways. Such additives can serve at least partially in a catalytic role. Examples of such additives include organic peroxides, such as di-tert-butyl peroxide or tert-butyl hydroperoxide. Other organic peroxides including functional groups known to provide improved stability for radicals (similar to a t-butyl functional group) could also be used.

Examples of Co-Processing Configurations

FIG. 1 shows an example of a configuration for co-processing plastic feedstock in a coking environment. It is understood that similar types of configurations could be used for other types of pyrolysis. In FIG. 1, a plastic feedstock 105 is combined one or more additional coking feedstocks 115 in a mixing vessel 120. The plastic feedstock 105 can correspond to a convenient source of polymers, such as plastic waste, that includes at least a portion of chlorine-containing polymers. Optionally but preferably, the plastic waste can undergo physical processing (not shown) so that the plastic feedstock 105 corresponds to plastic particles of a target size. Optionally, the plastic feedstock 105 and/or the coker feedstock(s) 115 can further include a biomass-derived portion and/or another type of oxygen-containing portion.

The mixture of plastic feedstock 105 and coking feedstock(s) 115 can be retained in the mixing vessel 120 at a temperature of 150° C. to 250° C. for a period of time to allow for dechlorination of the mixture. A purge gas 121 can also be introduced into mixing vessel 120 to remove HCl generated in the mixing vessel 120 via purge exhaust 122. Optionally, the purge gas 121 can include $O_2$ to facilitate decomposition of the plastic feedstock 105 to form HCl. Optionally, the mixture of plastic feedstock 105 and coking feedstock(s) 115 can also be retained in mixing vessel 120 for a sufficient period of time to form a solution of the plastic feedstock 105 in the coking feedstock(s) 115.

After dechlorination, the dechlorinated mixture 125 can be passed into a coking stage 150. The coking stage 150 can correspond to any convenient kind of coking, such as fluidized coking or delayed coking. The dechlorinated mixture is converted in coking stage 150 to form coker products 155 (liquid and gas) and solid coke product 159. The coker products 155 can then be fractionated (or otherwise separated) 130 to form one or more products. In the example shown in FIG. 1, the fractionation/separation 130 is used to separate out at least one gas phase product fraction 133 (such as $C_4$-products), one or more liquid product fractions 135 (such as coker naphtha, coker distillate, and/or coker gas oil), and a heavy product fraction. In the example shown in FIG. 1, the heavy product fraction is used as a recycle fraction 138 that is recycled back to mixing vessel 120. Optionally, the recycle fraction 138 could correspond to only a portion of the heavy product fraction (not shown). In other aspects, a different fraction of the coker products can be recycled, or no recycle can be used. In still other aspects, once steady state is achieved, the recycle fraction 138 can correspond to the majority or possibly substantially all of the one or more additional feedstocks that are introduced into mixing vessel 120, so that the amount of fresh coking feedstock(s) 115 can be reduced, minimized, or possibly eliminated.

Figure 2:
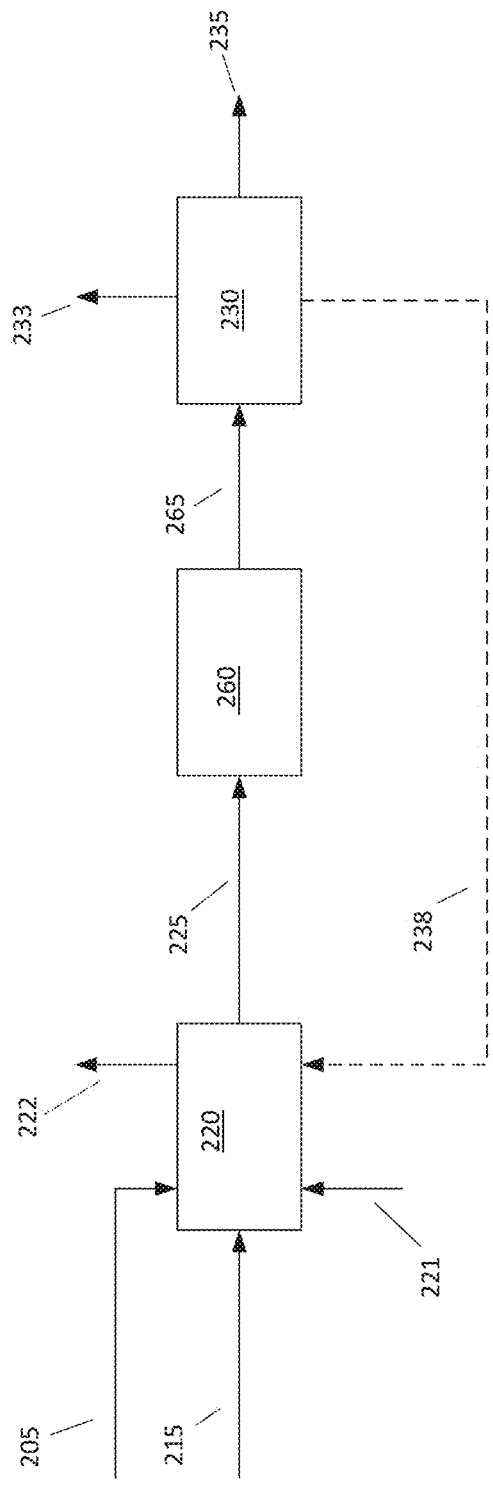
FIG. 2 shows an example of a process configuration for dechlorination of a feedstock mixture prior to co-processing in a fluid catalytic cracking stage.

FIG. 2 shows another example of a configuration for co-processing plastic feedstock. In FIG. 2, the co-processing is performed in a fluid catalytic cracking (FCC) environment. In FIG. 2, a plastic feedstock 205 is combined one or more additional FCC feedstocks 215 in a mixing vessel 220. The plastic feedstock 205 can correspond to a convenient source of polymers, such as plastic waste, that includes at least a portion of chlorine-containing polymers. Optionally but preferably, the plastic waste can undergo physical processing (not shown) so that the plastic feedstock 205 corresponds to plastic particles of a target size. Optionally, the plastic feedstock 205 and/or the FCC feedstock(s) 215 can further include a biomass-derived portion that corresponds to an oxygen-containing portion.

The mixture of plastic feedstock 205 and FCC feedstock(s) 215 can be retained in the mixing vessel 220 at a temperature of 150° C. to 250° C. for a period of time to allow for dechlorination of the mixture. A purge gas 221 can also be introduced into mixing vessel 220 to remove HCl generated in the mixing vessel 220 via purge exhaust 222. Optionally, the purge gas 221 can include $O_2$ to facilitate decomposition of the plastic feedstock 205 to form HCl. Optionally, the mixture of plastic feedstock 205 and FCC feedstock(s) 215 can also be retained in mixing vessel 220 for a sufficient period of time to form a solution of the plastic feedstock 205 in the FCC feedstock(s) 215.

After dechlorination, the dechlorinated mixture 225 can be passed into an FCC stage 260. The dechlorinated mixture is converted in FCC stage 260 to form FCC products 265. These FCC products 265 can include any gas phase products generated by the regeneration unit that is typically included as part of an FCC processing stage. The FCC products 265 can then be fractionated (or otherwise separated) 230 to form one or more products. In the example shown in FIG. 2, the fractionation/separation 230 is used to separate out at least one gas phase product fraction 233 (such as $C_4$-products), one or more liquid product fractions 235 (such as FCC naphtha, light cycle oil, and/or heavy cycle oil), and a heavy product fraction (such as heavy cycle oil and/or catalytic slurry oil). In the example shown in FIG. 2, the heavy product fraction is used as a recycle fraction 238 that is recycled back to mixing vessel 220. Optionally, the recycle fraction 238 could correspond to only a portion of the heavy product fraction (not shown). In other aspects, a different fraction of the FCC products can be recycled, or no recycle can be used. In still other aspects, once steady state is achieved, the recycle fraction 138 can correspond to the majority or possibly substantially all of the one or more additional feedstocks that are introduced into mixing vessel 120, so that the amount of fresh FCC feedstock(s) 115 can be reduced, minimized, or possibly eliminated.

Conditions for Co-Processing of Dechlorinated Mixture—Fluidized Coking

In some aspects, co-processing can be performed by exposing the dechlorinated mixture of plastic feedstock and additional feedstocks to thermal cracking conditions, such as coking, visbreaking, or other types of pyrolysis. Coking is described here as an illustrative example of the types of co-processing conditions that can be used.

Coking processes in modern refinery settings can typically be categorized as delayed coking or fluidized bed coking. Fluidized bed coking is a petroleum refining process in which heavy petroleum feeds, typically the non-distillable residues (resids) from the fractionation of heavy oils are converted to lighter, more useful products by thermal decomposition (coking) at elevated reaction temperatures, typically 480° C. to 590° C., (~900° F. to 1100° F.) and in most cases from 500° C. to 550° C. (~930° F. to 1020° F.). Heavy oils which may be processed by the fluid coking process include heavy atmospheric resids, petroleum vacuum distillation bottoms, aromatic extracts, asphalts, and bitumens from tar sands, tar pits and pitch lakes of Canada (Athabasca, Alta.), Trinidad, Southern California (La Brea (Los Angeles), McKittrick (Bakersfield, Calif.), Carpinteria (Santa Barbara County, Calif.), Lake Bermudez (Venezuela) and similar deposits such as those found in Texas, Peru, Iran, Russia and Poland. Such feeds can be co-processed with biomass oil. The biomass oil and conventional feed can be introduced separately, or the biomass oil and conventional feed can be mixed prior to introduction into the coking environment. The biomass oil and/or conventional feed can be introduced into the coking environment in a conventional manner.

The Flexicoking™ process, developed by Exxon Research and Engineering Company, is a variant of the fluid coking process that is operated in a unit including a reactor and a heater, but also including a gasifier for gasifying the coke product by reaction with an air/steam mixture to form a low heating value fuel gas. A stream of coke passes from the heater to the gasifier where all but a small fraction of the coke is gasified to a low-BTU gas (120 BTU/standard cubic feet) by the addition of steam and air in a fluidized bed in an oxygen-deficient environment to form fuel gas comprising carbon monoxide and hydrogen. In a conventional Flexicoking™ configuration, the fuel gas product from the gasifier, containing entrained coke particles, is returned to the heater to provide most of the heat required for thermal cracking in the reactor with the balance of the reactor heat requirement supplied by combustion in the heater. A small amount of net coke (about 1 percent of feed) is withdrawn from the heater to purge the system of metals and ash. The liquid yield and properties are comparable to those from fluid coking. The fuel gas product is withdrawn from the heater following separation in internal cyclones which return coke particles through their diplegs.

Figure 3:
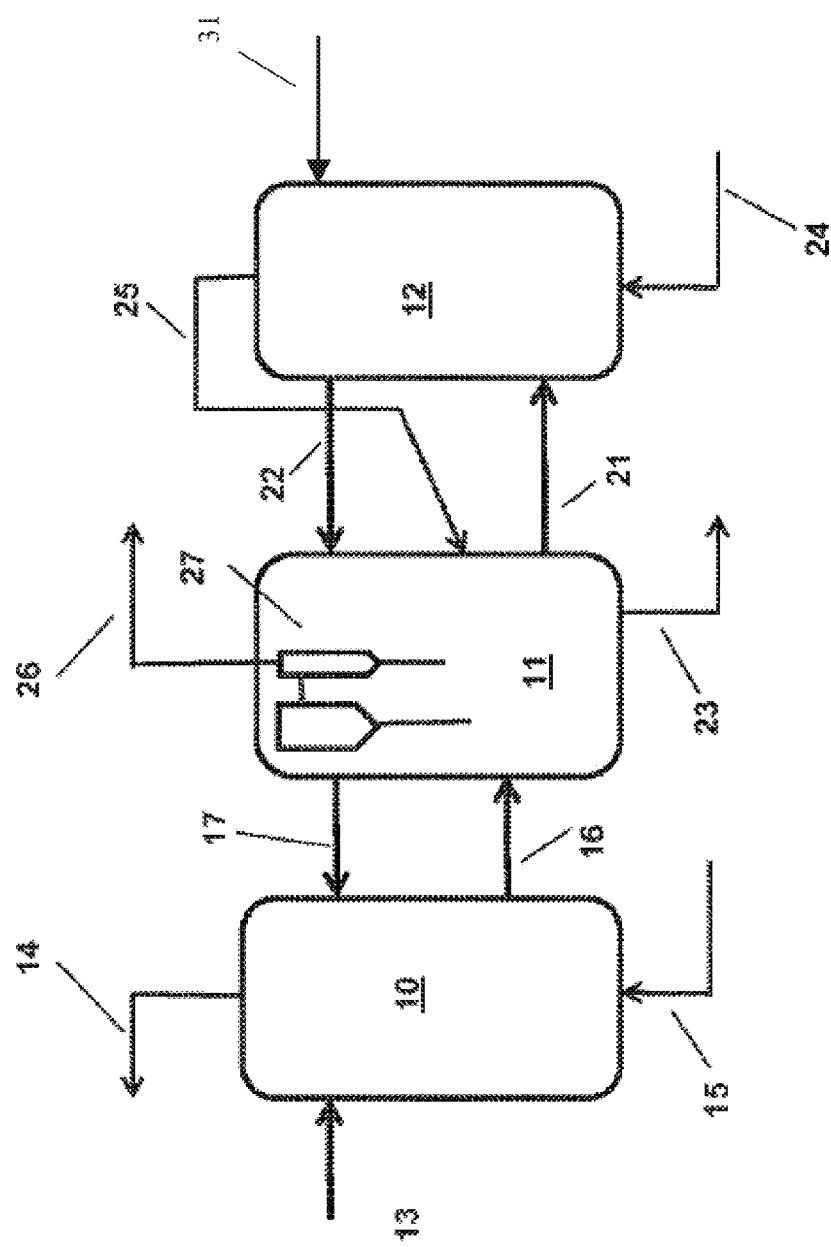
FIG. 3 shows an example of a fluidized coking stage configuration
Figure 4:
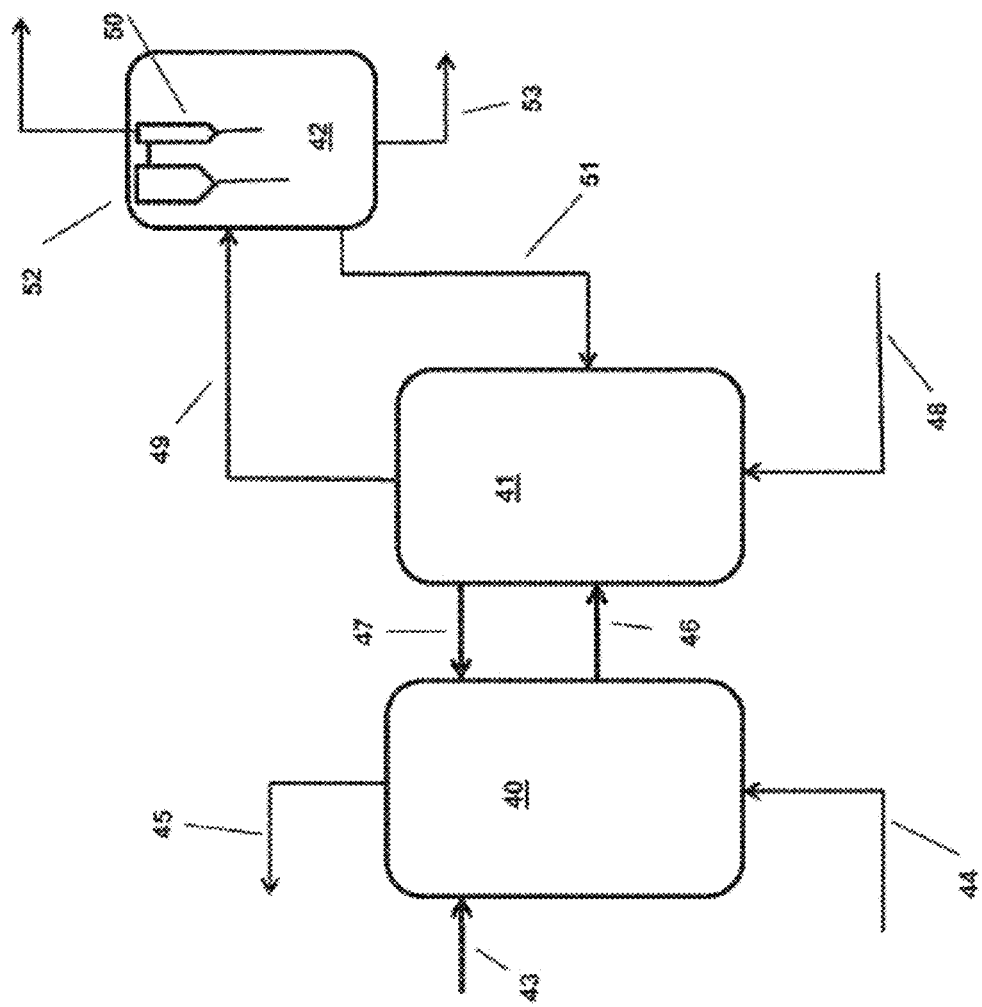
FIG. 4 shows another example of a fluidized coking stage configuration.

In this description, the term "Flexicoking" (trademark of ExxonMobil Research and Engineering Company) is used to designate a fluid coking process in which heavy petroleum feeds are subjected to thermal cracking in a fluidized bed of heated solid particles to produce hydrocarbons of lower molecular weight and boiling point along with coke as a by-product which is deposited on the solid particles in the fluidized bed. The resulting coke can then converted to a fuel gas by contact at elevated temperature with steam and an oxygen-containing gas in a gasification reactor (gasifier). This type of configuration can more generally be referred to as an integration of fluidized bed coking with gasification. FIGS. 3 and 4 provide examples of fluidized coking reactors that include a gasifier.

FIG. 3 shows an example of a Flexicoker unit (i.e., a system including a gasifier that is thermally integrated with a fluidized bed coker) with three reaction vessels; reactor, heater and gasifier. The unit comprises reactor section 10 with the coking zone and its associated stripping and scrubbing sections (not separately indicated), heater section 11 and gasifier section 12. The relationship of the coking zone, scrubbing zone and stripping zone in the reactor section is shown, for example, in U.S. Pat. No. 5,472,596, to which reference is made for a description of the Flexicoking unit and its reactor section. A heavy oil feed is introduced into the unit by line 13 and cracked hydrocarbon product withdrawn through line 14. Fluidizing and stripping steam is supplied by line 15. Cold coke is taken out from the stripping section at the base of reactor 10 by means of line 16 and passed to heater 11. The term "cold" as applied to the temperature of the withdrawn coke is, of course, decidedly relative since it is well above ambient at the operating temperature of the stripping section. Hot coke is circulated from heater 11 to reactor 10 through line 17. Coke from heater 11 is transferred to gasifier 12 through line 21 and hot, partly gasified particles of coke are circulated from the gasifier back to the heater through line 22. The excess coke is withdrawn from the heater 11 by way of line 23. In conventional configurations, gasifier 12 is provided with its supply of steam and air by line 24 and hot fuel gas is taken from the gasifier to the heater though line 25. In some alternative aspects, instead of supplying air via a line 24 to the gasifier 12, a stream of oxygen with 95 vol % purity or more can be provided, such as an oxygen stream from an air separation unit. In such aspects, in addition to supplying a stream of oxygen, a stream of an additional diluent gas can be supplied by line 31. The additional diluent gas can correspond to, for example, $CO_2$ separated from the fuel gas generated during the gasification. The fuel gas is taken out from the unit through line 26 on the heater; coke fines are removed from the fuel gas in heater cyclone system 27 comprising serially connected primary and secondary cyclones with diplegs which return the separated fines to the fluid bed in the heater. The fuel gas from line 26 can then undergo further processing. For example, in some aspects, the fuel gas from line 26 can be passed into a separation stage for separation of $CO_2$ (and/or $H_2S$). This can result in a stream with an increased concentration of synthesis gas, which can then be passed into a conversion stage for conversion of synthesis gas to methanol.

It is noted that in some optional aspects, heater cyclone system 27 can be located in a separate vessel (not shown) rather than in heater 11. In such aspects, line 26 can withdraw the fuel gas from the separate vessel, and the line 23 for purging excess coke can correspond to a line transporting coke fines away from the separate vessel. These coke fines and/or other partially gasified coke particles that are vented from the heater (or the gasifier) can have an increased content of metals relative to the feedstock. For example, the weight percentage of metals in the coke particles vented from the system (relative to the weight of the vented particles) can be greater than the weight percent of metals in the feedstock (relative to the weight of the feedstock). In other words, the metals from the feedstock are concentrated in the vented coke particles. Since the gasifier conditions do not create slag, the vented coke particles correspond to the mechanism for removal of metals from the coker/gasifier environment. In some aspects, the metals can correspond to a combination of nickel, vanadium, and/or iron. Additionally or alternately, the gasifier conditions can cause substantially no deposition of metal oxides on the interior walls of the gasifier, such as deposition of less than 0.1 wt % of the metals present in the feedstock introduced into the coker/gasifier system, or less than 0.01 wt %.

In configurations such as FIG. 3, the system elements shown in the figure can be characterized based on fluid communication between the elements. For example, reactor section 10 is in direct fluid communication with heater 11. Reactor section 10 is also in indirect fluid communication with gasifier 12 via heater 11.

As an alternative, integration of a fluidized bed coker with a gasifier can also be accomplished without the use of an intermediate heater. In such alternative aspects, the cold coke from the reactor can be transferred directly to the gasifier. This transfer, will in almost all cases, will be unequivocally direct with one end of the tubular transfer line connected to the coke outlet of the reactor and its other end connected to the coke inlet of the gasifier with no intervening reaction vessel, i.e. heater. The presence of devices other than the heater is not however to be excluded, e.g. inlets for lift gas etc. Similarly, while the hot, partly gasified coke particles from the gasifier are returned directly from the gasifier to the reactor this signifies only that there is to be no intervening heater as in the conventional three-vessel Flexicoker™ but that other devices may be present between the gasifier and the reactor, e.g. gas lift inlets and outlets.

FIG. 4 shows an example of integration of a fluidized bed coker with a gasifier but without a separate heater vessel. In the configuration shown in FIG. 4, the cyclones for separating fuel gas from catalyst fines are located in a separate vessel. In other aspects, the cyclones can be included in gasifier vessel 41.

In the configuration shown in FIG. 4, the configuration includes a reactor 40, a main gasifier vessel 41 and a separator 42. The heavy oil feed is introduced into reactor 40 through line 43 and fluidizing/stripping gas through line 44; cracked hydrocarbon products are taken out through line 45. Cold, stripped coke is routed directly from reactor 40 to gasifier 41 by way of line 46 and hot coke returned to the reactor in line 47. Steam and oxygen are supplied through line 48. The flow of gas containing coke fines is routed to separator vessel 42 through line 49 which is connected to a gas outlet of the main gasifier vessel 41. The fines are separated from the gas flow in cyclone system 50 comprising serially connected primary and secondary cyclones with diplegs which return the separated fines to the separator vessel. The separated fines are then returned to the main gasifier vessel through return line 51 and the fuel gas product taken out by way of line 52. Coke is purged from the separator through line 53. The fuel gas from line 52 can then undergo further processing for separation of $CO_2$ (and/or $H_2S$) and conversion of synthesis gas to methanol.

The coker and gasifier can be operated according to the parameters necessary for the required coking processes. Thus, the heavy oil feed will typically be a heavy (high boiling) reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from 5 to 50 wt. %. Preferably, the feed is a petroleum vacuum residuum.

Fluidized coking is carried out in a unit with a large reactor containing hot coke particles which are maintained in the fluidized condition at the required reaction temperature with steam injected at the bottom of the vessel with the average direction of movement of the coke particles being downwards through the bed. The heavy oil feed is heated to a pumpable temperature, typically in the range of 350° C. to 400° C. (~660° F. to 750° F.), mixed with atomizing steam, and fed through multiple feed nozzles arranged at several successive levels in the reactor. Steam is injected into a stripping section at the bottom of the reactor and passes upwards through the coke particles descending through the dense phase of the fluid bed in the main part of the reactor above the stripping section. Part of the feed liquid coats the coke particles in the fluidized bed and is subsequently cracked into layers of solid coke and lighter products which evolve as gas or vaporized liquid. The residence time of the feed in the coking zone (where temperatures are suitable for thermal cracking) is on the order of 1 to 30 seconds. Reactor pressure is relatively low in order to favor vaporization of the hydrocarbon vapors which pass upwards from dense phase into dilute phase of the fluid bed in the coking zone and into cyclones at the top of the coking zone where most of the entrained solids are separated from the gas phase by centrifugal force in one or more cyclones and returned to the dense fluidized bed by gravity through the cyclone diplegs. The mixture of steam and hydrocarbon vapors from the reactor is subsequently discharged from the cyclone gas outlets into a scrubber section in a plenum located above the coking zone and separated from it by a partition. It is quenched in the scrubber section by contact with liquid descending over sheds. A pumparound loop circulates condensed liquid to an external cooler and back to the top shed row of the scrubber section to provide cooling for the quench and condensation of the heaviest fraction of the liquid product. This heavy fraction is typically recycled to extinction by feeding back to the coking zone in the reactor.

During a fluidized coking process, the heavy oil feed, pre-heated to a temperature at which it is flowable and pumpable, is introduced into the coking reactor towards the top of the reactor vessel through injection nozzles which are constructed to produce a spray of the feed into the bed of fluidized coke particles in the vessel. Temperatures in the coking zone of the reactor are typically in the range of 450° C. to 650° C. and pressures are kept at a relatively low level, typically in the range of 0 kPag to 700 kPag (~0 psig to 100 psig), and most usually from 35 kPag to 320 kPag (~5 psig to 45 psig), in order to facilitate fast drying of the coke particles, preventing the formation of sticky, adherent high molecular weight hydrocarbon deposits on the particles which could lead to reactor fouling. In some aspects, the temperature in the coking zone can be 450° C. to 600° C. or 450° C. to 550° C. The conditions can be selected so that a desired amount of conversion of the feedstock occurs in the fluidized bed reactor. For example, the conditions can be selected to achieve at least 10 wt % conversion relative to 343° C. (or 371° C.), or at least 20 wt % conversion relative 343° C. (or 371° C.), or at least 40 wt % conversion relative to 343° C. (or 371° C.), such as up to 80 wt % conversion or possibly still higher. The light hydrocarbon products of the coking (thermal cracking) reactions vaporize, mix with the fluidizing steam and pass upwardly through the dense phase of the fluidized bed into a dilute phase zone above the dense fluidized bed of coke particles. This mixture of vaporized hydrocarbon products formed in the coking reactions flows upwardly through the dilute phase with the steam at superficial velocities of roughly 1 to 2 meters per second (~3 to 6 feet per second), entraining some fine solid particles of coke which are separated from the cracking vapors in the reactor cyclones as described above. In aspects where steam is used as the fluidizing agent, the weight of steam introduced into the reactor can be selected relative to the weight of feedstock introduced into the reactor. For example, the mass flow rate of steam into the reactor can correspond to 6.0% of the mass flow rate of feedstock, or 8.0% or more, such as up to 10% or possibly still higher. The amount of steam can potentially be reduced if an activated light hydrocarbon stream is used as part of the stripping and/or fluidizing gas in the reactor. In such aspects, the mass flow rate of steam can correspond to 6.0% of the mass flow rate of feedstock or less, or 5.0% or less, or 4.0% or less, or 3.0% or less. Optionally, in some aspects, the mass flow rate of steam can be still lower, such as corresponding to 1.0% of the mass flow rate of feedstock or less, or 0.8% or less, or 0.6% or less, such as down to substantially all of the steam being replaced by the activated light hydrocarbon stream. The cracked hydrocarbon vapors pass out of the cyclones into the scrubbing section of the reactor and then to product fractionation and recovery.

In a general fluidized coking process, the coke particles formed in the coking zone pass downwards in the reactor and leave the bottom of the reactor vessel through a stripper section where they are exposed to steam in order to remove occluded hydrocarbons. The solid coke from the reactor, consisting mainly of carbon with lesser amounts of hydrogen, sulfur, nitrogen, and traces of vanadium, nickel, iron, and other elements derived from the feed, passes through the stripper and out of the reactor vessel to a burner or heater where it is partly burned in a fluidized bed with air to raise its temperature from 480° C. to 700° C. (~900° F. to 1300° F.) to supply the heat required for the endothermic coking reactions, after which a portion of the hot coke particles is recirculated to the fluidized bed reaction zone to transfer the heat to the reactor and to act as nuclei for the coke formation. The balance is withdrawn as coke product. The net coke yield is only about 65 percent of that produced by delayed coking.

For a coking process that includes a gasification zone, the cracking process proceeds in the reactor, the coke particles pass downwardly through the coking zone, through the stripping zone, where occluded hydrocarbons are stripped off by the ascending current of fluidizing gas (steam). They then exit the coking reactor and pass to the gasification reactor (gasifier) which contains a fluidized bed of solid particles and which operates at a temperature higher than that of the reactor coking zone. In the gasifier, the coke particles are converted by reaction at the elevated temperature with steam and an oxygen-containing gas into a fuel gas comprising carbon monoxide and hydrogen.

The gasification zone is typically maintained at a high temperature ranging from 850° C. to 1000° C. (~1560° F. to 1830° F.) and a pressure ranging from 0 kPag to 1000 kPag (~0psig to 150 psig), preferably from 200 kPag to 400 kPag (~30 psig to 60 psig). Steam and an oxygen-containing gas are introduced to provide fluidization and an oxygen source for gasification. In some aspects the oxygen-containing gas can be air. In other aspects, the oxygen-containing gas can have a low nitrogen content, such as oxygen from an air separation unit or another oxygen stream including 95 vol % or more of oxygen, or 98 vol % or more, are passed into the gasifier for reaction with the solid particles comprising coke deposited on them in the coking zone. In aspects where the oxygen-containing gas has a low nitrogen content, a separate diluent stream, such as a recycled $CO_2$ or $H_2S$ stream derived from the fuel gas produced by the gasifier, can also be passed into the gasifier.

In the gasification zone the reaction between the coke and the steam and the oxygen-containing gas produces a hydrogen and carbon monoxide-containing fuel gas and a partially gasified residual coke product. Conditions in the gasifier are selected accordingly to generate these products. Steam and oxygen rates (as well as any optional $CO_2$ rates) will depend upon the rate at which cold coke enters from the reactor and to a lesser extent upon the composition of the coke which, in turn will vary according to the composition of the heavy oil feed and the severity of the cracking conditions in the reactor with these being selected according to the feed and the range of liquid products which is required. The fuel gas product from the gasifier may contain entrained coke solids and these are removed by cyclones or other separation techniques in the gasifier section of the unit; cyclones may be internal cyclones in the main gasifier vessel itself or external in a separate, smaller vessel as described below. The fuel gas product is taken out as overhead from the gasifier cyclones. The resulting partly gasified solids are removed from the gasifier and introduced directly into the coking zone of the coking reactor at a level in the dilute phase above the lower dense phase.

In some aspects, the coking conditions can be selected to provide a desired amount of conversion relative to 343° C. Typically a desired amount of conversion can correspond to 10 wt % or more, or 50 wt % or more, or 80 wt % or more, such as up to substantially complete conversion of the feedstock relative to 343° C.

Delayed coking is a process for the thermal conversion of heavy oils such as petroleum residua (also referred to as "resid") to produce liquid and vapor hydrocarbon products and coke. Delayed coking of resids from heavy and/or sour (high sulfur) crude oils is carried out by converting part of the resids to more valuable hydrocarbon products. The resulting coke has value, depending on its grade, as a fuel (fuel grade coke), electrodes for aluminum manufacture (anode grade coke), etc.

Generally, a residue fraction, such as a petroleum residuum feed is pumped to a pre-heater where it is pre-heated, such as to a temperature from 480° C. to 520° C. The pre-heated feed is then conducted to a coking zone, typically a vertically-oriented, insulated coker vessel, e.g., drum, through an inlet at the base of the drum. Pressure in the drum is usually relatively low, such as 15 psig (~100 kPa-g) to 80 psig (~550 kPa-g), or 15 psig (~100 kPa-g) to 35 psig (~240 kPa-g) to allow volatiles to be removed overhead. Typical operating temperatures of the drum will be between roughly 475° C. to 525° C. The hot feed thermally cracks over a period of time (the "coking time") in the coke drum, liberating volatiles composed primarily of hydrocarbon products that continuously rise through the coke bed, which consists of channels, pores and pathways, and are collected overhead. The volatile products are conducted to a coker fractionator for distillation and recovery of coker gases, gasoline boiling range material such as coker naphtha, light gas oil, and heavy gas oil. In an embodiment, a portion of the heavy coker gas oil present in the product stream introduced into the coker fractionator can be captured for recycle and combined with the fresh feed (coker feed component), thereby forming the coker heater or coker furnace charge. In addition to the volatile products, the process also results in the accumulation of coke in the drum. When the coke drum is full of coke, the heated feed is switched to another drum and hydrocarbon vapors are purged from the coke drum with steam. The drum is then quenched with water to lower the temperature down to 200° F. (~95° C.) to 300° F. (~150° C.), after which the water is drained. When the draining step is complete, the drum is opened and the coke is removed by drilling and/or cutting using high velocity water jets ("hydraulic decoking").

The volatile products from the coke drum are conducted away from the process for further processing. For example, volatiles can be conducted to a coker fractionator for distillation and recovery of coker gases, coker naphtha, light gas oil, and heavy gas oil. Such fractions can be used, usually, but not always, following upgrading, in the blending of fuel and lubricating oil products such as motor gasoline, motor diesel oil, fuel oil, and lubricating oil. Upgrading can include separations, heteroatom removal via hydrotreating and non-hydrotreating processes, de-aromatization, solvent extraction, and the like. The process is compatible with processes where at least a portion of the heavy coker gas oil present in the product stream introduced into the coker fractionator is captured for recycle and combined with the fresh feed (coker feed component), thereby forming the coker heater or coker furnace charge. The combined feed ratio ("CFR") is the volumetric ratio of furnace charge (fresh feed plus recycle oil) to fresh feed to the continuous delayed coker operation. Delayed coking operations typically employ recycles of 5 vol % to 35% vol % (CFRs of about 1.05 to about 1.35). In some instances there can be no recycle and sometimes in special applications recycle can be up to 200%.

Conditions for Co-Processing of Dechlorinated Mixture—FCC Processing Conditions

Fluid catalytic cracking is another type of processing that can be used for co-processing of a plastic feedstock and one or more additional feedstocks.

An example of a suitable reactor for performing an FCC process can be a riser reactor. Within the reactor riser, the feeds for co-processing can be contacted with a catalytic cracking catalyst under cracking conditions thereby resulting in spent catalyst particles containing carbon deposited thereon and a lower boiling product stream. The cracking conditions can include: temperatures from 900° F. to 1060° F. (~482° C. to ~571° C., or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In some aspects, the FCC feed residence time in the reaction zone can be less than 5 seconds, or from 3 to 5 seconds, or from 2 to 3 seconds.

Catalysts suitable for use within the FCC reactor herein can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.7 nm which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (ALPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L, ZK-4, ZK-5, B, E, F, H, J, M, Q, T, W, Z, alpha and beta, omega, REY and USY zeolites. In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson. Butterworth-Heineman. Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix can be made from an inorganic oxide sol or gel which can be dried to "glue" the catalyst components together. Preferably, the inorganic oxide matrix can be comprised of oxides of silicon and aluminum. It can be preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts be present in the same or different catalyst particles, in the aforesaid inorganic oxide matrix.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from 1200° F. to 1400° F. (~649 to 760° C.). The majority of, and preferably substantially all of the hot regenerated catalyst particles can then be recycled to the FCC reaction zone where they contact injected FCC feed.

EXAMPLES

In the following examples, thermogravimetric analysis was used to characterize decomposition of chloride-containing polymers. It is believed that similar results could be achieved by decomposition of chlorine-containing polymers in batch reactors with appropriate mixing and use of purge gas. This was also confirmed by additional runs in pilot scale batch reactors where 0.4 wt % or 0.5 wt % PVC dissolved in various higher boiling feedstocks was maintained at temperatures of 250° C. or less while passing a purge gas through the batch reactor.

Example 1—Dechlorination of Feedstock Containing PVC

A series of runs were performed using thermogravimetric analysis on feedstocks that included polyvinyl chloride (PVC) as a feed component to determine the rate of weight loss at an elevated temperature. As an initial test, thermogravimetric analysis was used on a) PVC alone; and b) PVC combined with a conventional vacuum resid boiling range feedstock, to determine weight loss as a function of time. During the thermogravimetric analysis, the temperature was maintained at 200° C. or 250° C. while a purge gas was flowed through the vessel. It is noted that for the mixtures of PVC in vacuum resid, substantial mixing of the PVC in the vacuum resid at roughly 100° C. to 120° C. was performed prior to introducing a sample into the thermogravimetric analysis unit, in order to improve the repeatability of the results.

Figure 5:
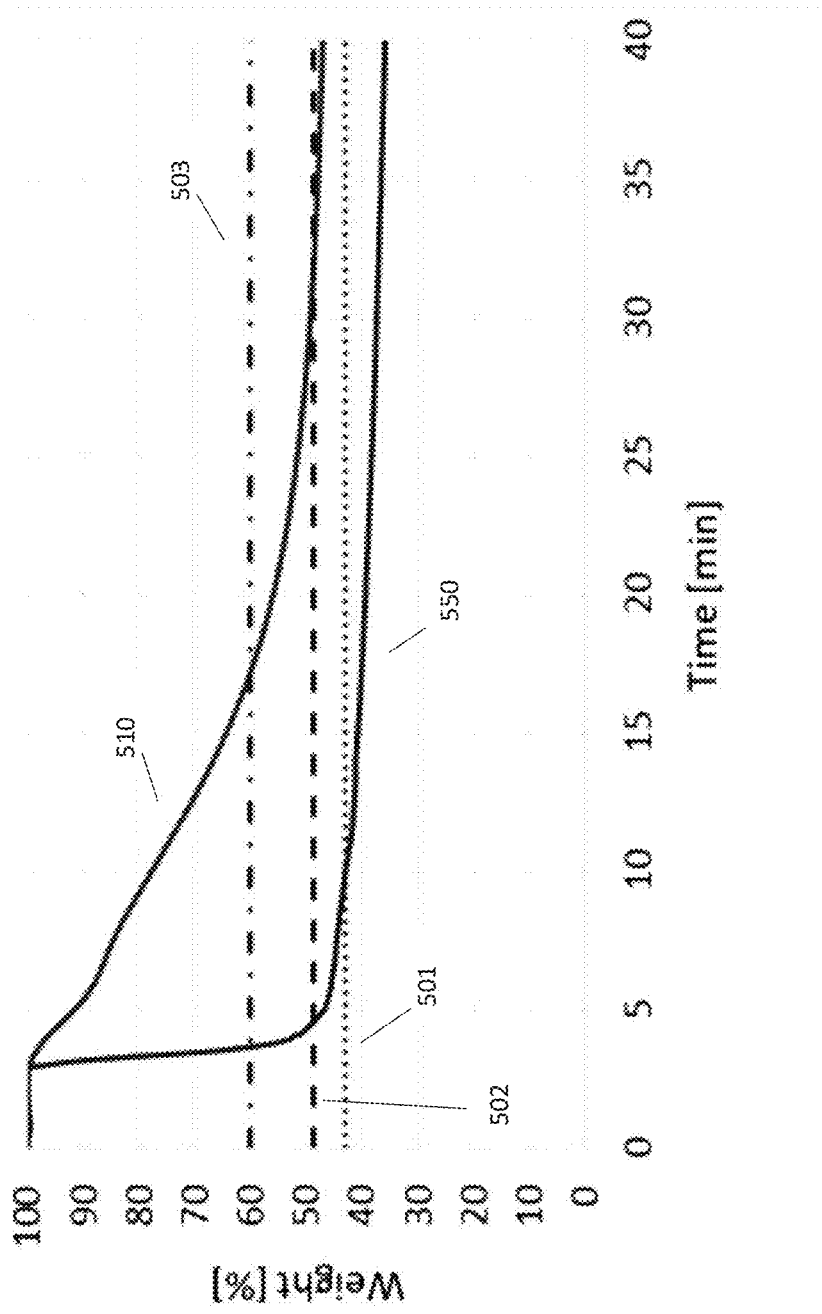
FIG. 5 shows weight loss during thermogravimetric analysis of various samples containing PVC.
Figure 6:
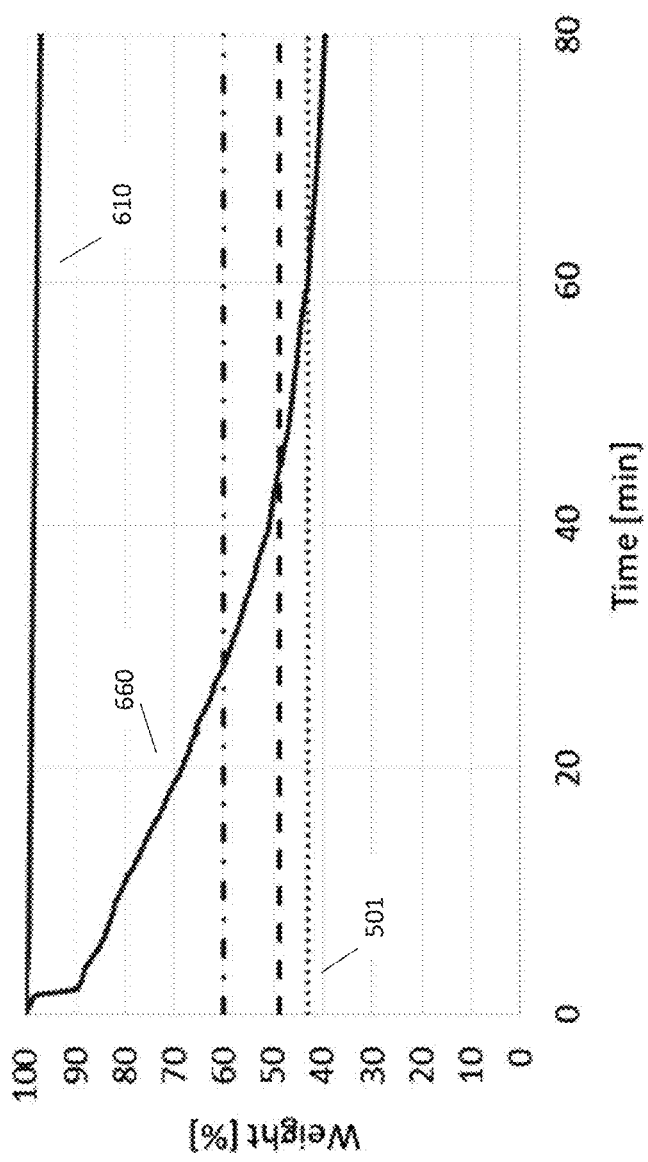
FIG. 6 shows weight loss during dechlorination of various samples containing PVC.

In this example, the thermogravimetric analysis was performed on PVC or a mixture of PVC (~10 wt %) and vacuum resid (~90 wt %). Results from these runs are shown in FIGS. 5 and 6. In FIGS. 5 and 6, the percentage of mass lost during the thermogravimetric analysis is shown relative to the total mass, as opposed to showing the percentage of chlorine that is removed. It is noted that in a separate thermogravimetric analysis run, the vacuum resid alone was heated to various temperatures below 300° C., and substantially no weight loss was observed. Due to the relatively low temperature (300° C. or less) in all of the thermogravimetric analysis runs, it is expected that all weight loss is due to decomposition of the PVC (or other chlorine-containing polymer), and not due to decomposition of the vacuum resid.

FIG. 5 shows results from performing dechlorination at 250° C. of PVC alone and a mixture of PVC and a vacuum resid boiling range feedstock. In FIG. 5, the amount of weight of PVC remaining is shown relative to the amount of time for the dechlorination. Line 510 corresponds to the PVC only feedstock, while line 550 corresponds to the mixture of PVC and vacuum resid. Additionally, dotted line 501 is included in FIG. 5 at roughly 43 wt %. Because PVC is roughly 57 wt % chlorine, 43 wt % represents the weight of the PVC that would be left behind if all chlorine in the sample were removed while retaining all of the carbon and hydrogen. Dotted lines 502 and 503 correspond to the weights for 90% removal and 70% removal of chlorine, respectively.

As shown in FIG. 5, heating of PVC alone at 250° C. (line 510) resulted in slow decomposition of the PVC. After 1 hour, the amount of weight remaining in the PVC sample is still near 50 wt %, meaning that at least some chlorine is still likely present in the sample. It is noted that in additional runs, substantially complete dechlorination was achieved by extending the run time to roughly 120 minutes.

For line 550, the weight remaining is shown for the PVC portion of the mixture only. (As noted above, it is assumed that the vacuum resid portion of the mixture does not have weight loss.) In contrast to the decomposition of PVC alone, for the mixture of PVC in vacuum resid (line 550), the dechlorination was substantially more rapid. The weight of PVC remaining in the mixture approached 43 wt % after roughly 10 minutes of time at 250° C. Small amounts of additional weight loss were observed over additional time, bringing the net weight of PVC remaining to below; 40 wt %. This is believed to be due to some formation of light gases from carbon and hydrogen in the PVC. It is believed that the portions of line 550 where less than 40 wt % of the PVC is retained in the sample correspond to substantially complete dechlorination of the mixture. Thus, by dissolving PVC in vacuum resid and then introducing a purge gas, it was unexpectedly discovered that substantially complete dechlorination of PVC could be achieved in a relatively rapid time frame.

FIG. 6 shows that similar substantially complete dechlorination can be achieved at a temperature of 200° C. The procedure for generating FIG. 6 was similar to the procedure for FIG. 6, but the neat PVC or the mixture of PVC (10 wt %) and vacuum resid (90 wt %) was maintained at 200° C. instead of 250° C. As shown in FIG. 6, the sample including only PVC (line 610) showed only minimal weight loss. By contrast, for the sample including the mixture of PVC and vacuum resid (line 660), the weight of PVC remaining dropped to roughly 43 wt % at 60 minutes, and dropped below 40 wt % for times of 70 minutes or more. This shows the unexpected outcome that substantially complete dechlorination of a mixture of plastic feedstock and an additional feedstock was achieved at a temperature where PVC alone showed little or no tendency to undergo dechlorination.

Example 2—Decomposition of PVC in the Presence of Inorganic Additives

Decomposition of PVC or PVDC (without additional feedstock) was also investigated in the presence of inorganic additives using isothermal thermogravimetric analysis. During the runs for decomposition of PVC or PVDC, additives were added to the PVC or PVDC to form a mixture with a target weight percentage of additive. Thermogravimetric analysis could then be used to determine the impact of the additives on the weight of PVC or PVDC that was removed. During the thermogravimetric analysis runs, the samples were heated rapidly at a rate of roughly 200° C. per minute until the target temperature for the thermogravimetric analysis was achieved.

Figure 7:
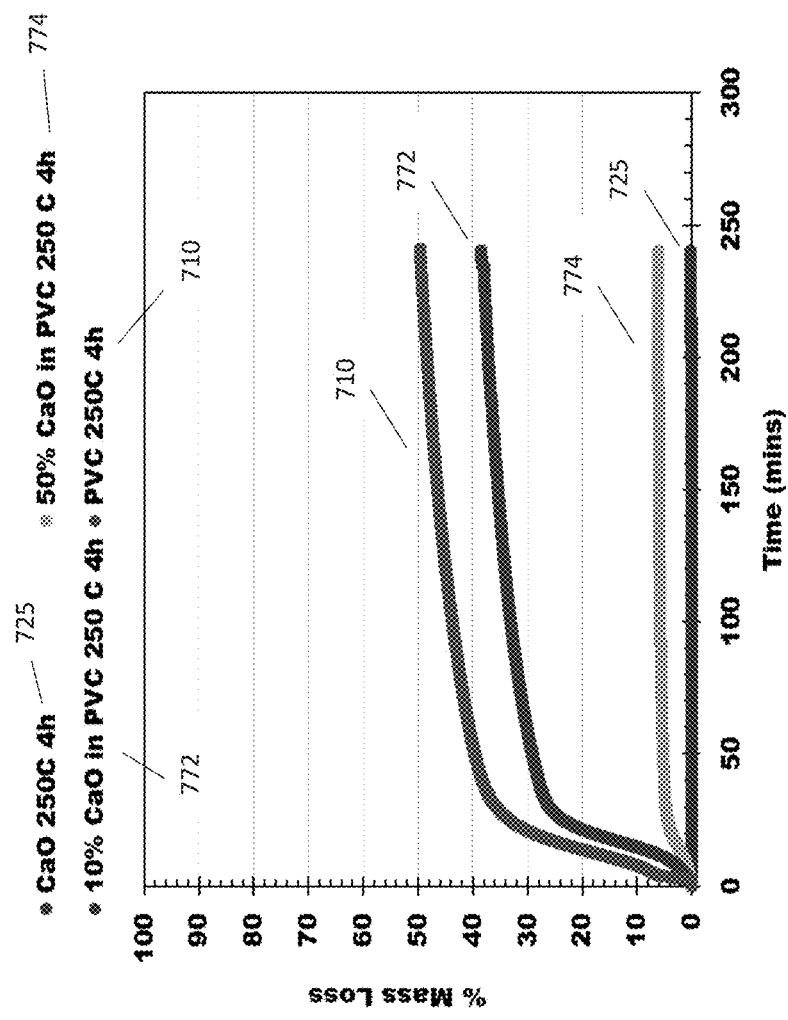
FIG. 7 shows weight loss during thermogravimetric analysis of various samples containing PVC and/or CaO.

In a first set of runs, addition of calcium oxide (CaO) during decomposition of PVC was investigated. FIG. 7 shows the results from decomposition of various samples of PVC and PVC plus CaO at 250° C. In FIG. 7, the reference numerals are used to identify both the data set in the graph as well as the corresponding portion of the legend. As shown in FIG. 7, maintaining PVC at 250° C. for 4 hours (line 710) resulted in loss of roughly 50 wt % of the mass of the PVC. It is noted that this is a slower rate of decomposition for PVC alone than was observed for the run shown in FIG. 5 (line 510). However, it is believed that this reflects variations in different samples of PVC as well as variations in conditions, and that substantially complete dechlorination would be achieved if the run had been continued for additional time. For comparison purposes, a sample containing only CaO was also exposed to 250° C. for 4 hours. As expected, no weight loss was observed from the CaO.

Runs were also performed with mixtures that included 10 wt % CaO (line 772) and 50 wt % CaO (line 774) mixed with the PVC. For the mixtures of PVC and CaO, addition of the CaO tended to lower the amount of weight lost from the sample during the thermogravimetric analysis. Based on the results shown in FIG. 7, it is believed that the reduced weight loss still represents decomposition of the PVC to remove chlorine. However, it is believed that the CaO results in formation of $CaCl_2$ as the final product, rather than HCl. Because the $CaCl_2$ is a solid at 250° C., the only weight loss from the reaction is water that is generated as a by-product of the reaction. Based on stoichiometry, 1 mole of CaO can react with 2 moles of HCl to form one mole of $CaCl_2$ and 1 mole of water. This amount of $CaCl_2$) formation after complete dechlorination would also result in formation of water corresponding to roughly 7.4 wt % of an initial stoichiometric mixture of PVC and CaO. As shown in FIG. 7, for the mixture corresponding 50 wt % CaO, the amount of weight lost during the thermogravimetric analysis was slightly lower than 7.0 wt % of the original sample, indicating that the dechlorination was not complete.

Thermogravimetric analysis was also performed on samples of polyvinylidene dichloride (PVDC) with and without added CaO. The procedure was similar to the procedure for the data in FIG. 7, with the exception that PVDC were used. The results are shown in FIG. 8.

Figure 8:
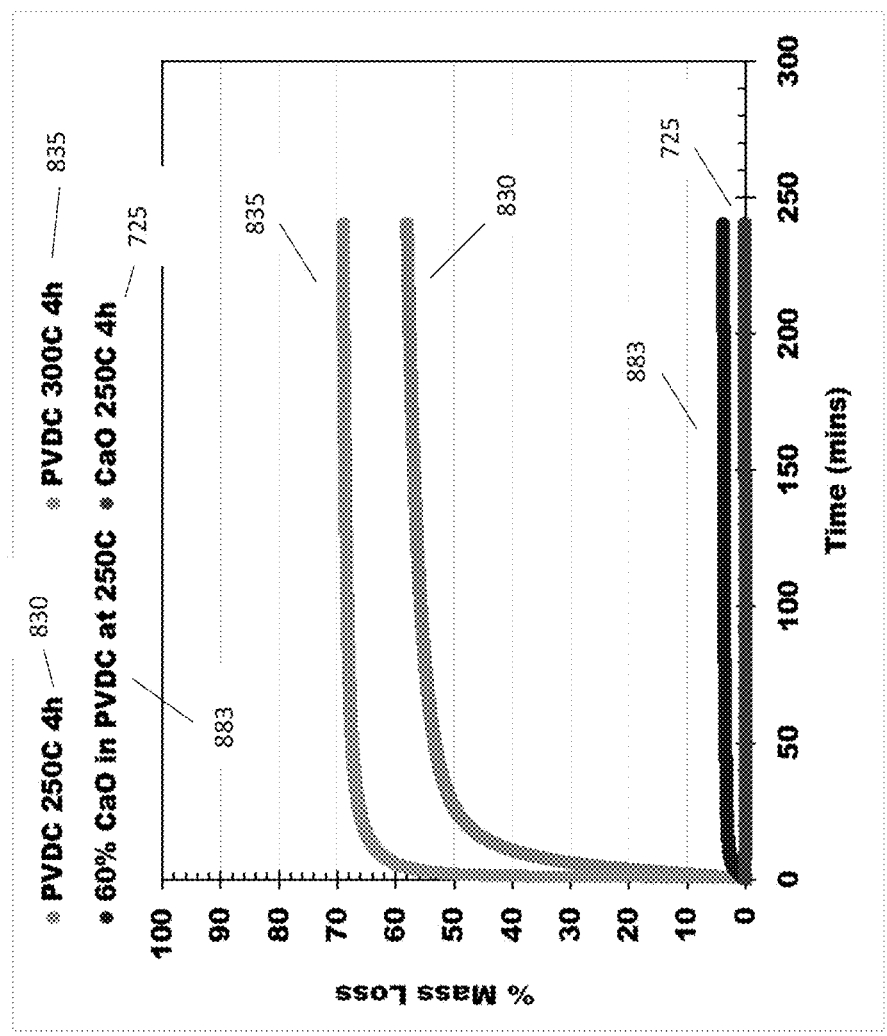
FIG. 8 shows weight loss during thermogravimetric analysis of various samples containing PVDC and/or CaO.

As shown in FIG. 8, thermogravimetric decomposition was performed at both 250° C. and 300° C. for PVDC. Even at 300° C., the weight loss for the PVDC was less than 70 wt %, which is below the weight of chlorine in PVDC (roughly 73 wt %). This again illustrates the difficulty of achieving substantially complete dechlorination for polymer samples at temperatures of 300° C. or less in short time frames without the presence of an additional feedstock. An additional run was also performed that included 60 wt % CaO. Similar to PVC, addition of CaO to PVDC resulted in less weight loss during thermogravimetric analysis, due to formation of non-volatile $CaCl_2$ in place of HCl.

Figure 9:
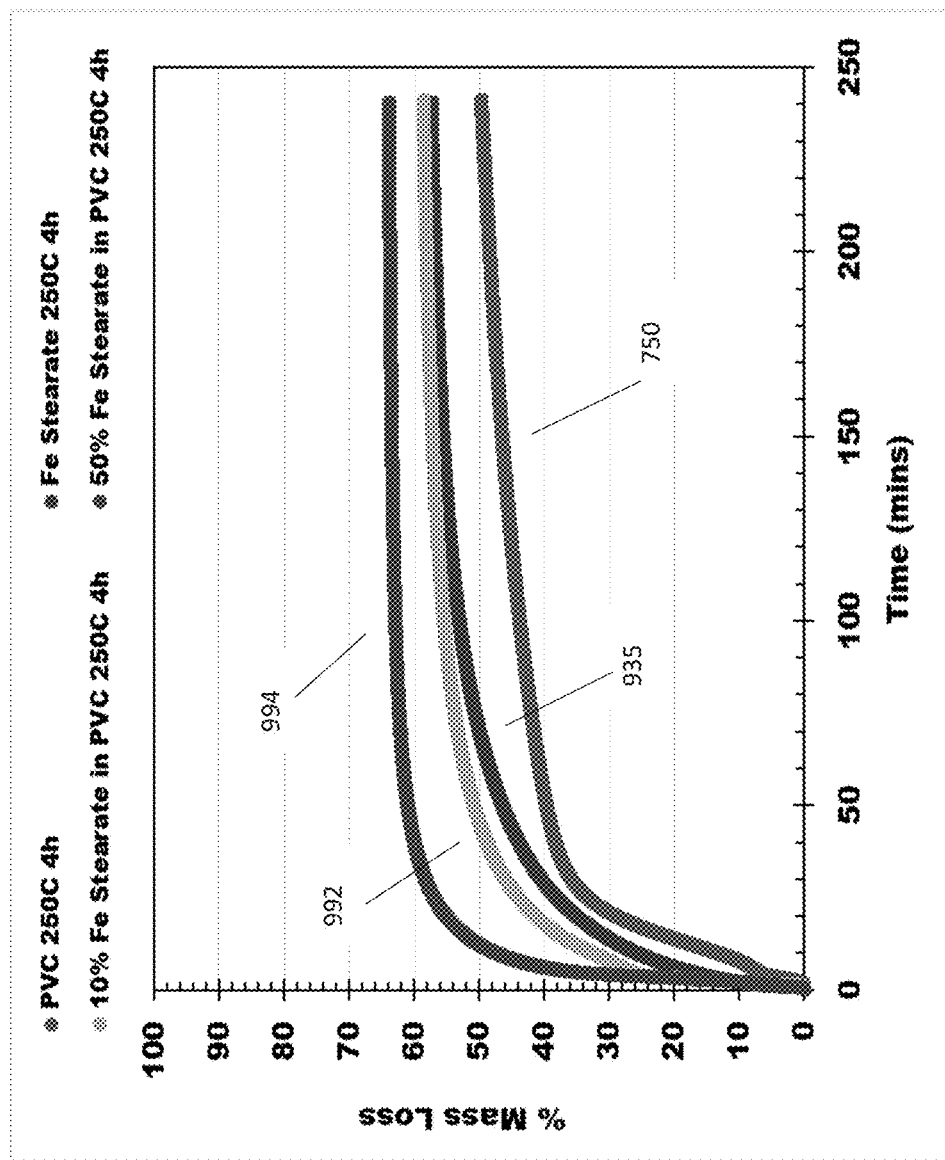
FIG. 9 shows weight loss during thermogravimetric analysis of various samples containing PVC and/or iron stearate.

FIG. 9 shows more results for decomposition of PVC, but with iron stearate as the additive rather than calcium oxide. The procedures used to generate the data shown in FIG. 9 were otherwise similar to the procedures used for the data in FIG. 7. For comparison purposes, a run including only iron stearate was also performed.

As shown in FIG. 9, iron stearate alone (line 935) was able to decompose at 250° C., resulting in a mass loss of roughly 50 wt % of the iron stearate. Runs were also performed where 10 wt % (line 992) or 50 wt % (line 994) of iron stearate were included in a mixture with the PVC. As shown in FIG. 9, for the mixtures of iron stearate and PVC, the mass loss from the two compounds in the mixture appeared to be additive. However, there may have been some increase in the rate of PVC decomposition, possibly indicating a catalytic effect from addition of the iron stearate.

ADDITIONAL EMBODIMENTS

Embodiment 1. A method for co-processing a plastic feedstock, comprising: mixing a plastic feedstock comprising plastic particles having an average diameter of 10 cm or less with one or more additional feedstocks to form a feedstock mixture, the plastic feedstock comprising a chlorine-containing polymer, the feedstock mixture comprising 1.0 wt % to 50 wt % of the plastic feedstock relative to a weight of the feedstock mixture, the one or more additional feedstocks comprising a T5 distillation point that is greater than a dechlorination temperature of 170° C. to 250° C.; maintaining the feedstock mixture in a vessel at the dechlorination temperature for 1.0 minute to 240 minutes to form a dechlorinated mixture of feedstocks; passing a purge stream comprising a purge gas through the vessel to form a purge exhaust stream comprising at least a portion of the purge gas; and processing the dechlorinated mixture of feedstocks in a co-processing stage for conversion of at least a portion of the dechlorinated mixture of feedstocks to form a conversion effluent.

Embodiment 2. A method for co-processing a plastic feedstock, comprising: mixing a plastic feedstock comprising plastic particles having an average diameter of 10 cm or less with one or more additional feedstocks to form a feedstock mixture, the plastic feedstock comprising a chlorine-containing polymer, the feedstock mixture comprising 1.0 wt % to 50 wt % of the plastic feedstock relative to a weight of the feedstock mixture, the one or more additional feedstocks comprising a T10 distillation point (or optionally a T5 distillation point) that is greater than a dechlorination temperature of 170° C. to 300° C.; maintaining the feedstock mixture in a vessel at the dechlorination temperature for 1.0 minute to 240 minutes to form a dechlorinated mixture of feedstocks; passing a purge stream comprising a purge gas through the vessel to form a purge exhaust stream comprising at least a portion of the purge gas; and processing the dechlorinated mixture of feedstocks in a co-processing stage for conversion of at least a portion of the dechlorinated mixture of feedstocks to form a conversion effluent, the processing in the co-processing stage comprising a) a temperature of 475° C. or higher, b) a temperature that is greater than the dechlorination temperature by 200° C. or more, or c) a combination of a) and b).

Embodiment 3. The method of any of the above embodiments wherein the co-processing stage comprises at least one of a pyrolysis stage, a delayed coking stage, a fluidized coking stage, and a visbreaking stage; or wherein the co-processing stage comprises a fluid catalytic cracking stage.

Embodiment 4. The method of any of the above embodiments, further comprising separating the conversion effluent to form at least one product fraction and at least one recycle fraction, the method further comprising combining the at least one recycle fraction with a) the one or more additional feedstocks prior to entering the vessel, b) the feedstock mixture in the vessel, c) the dechlorinated mixture of feedstocks after leaving the vessel and prior to processing the dechlorinated mixture of feedstocks in the co-processing stage, or d) a combination of two or more of a)-c).

Embodiment 5. The method of any of the above embodiments, wherein the dechlorination temperature is 170° C. to 230° C.; or wherein the one or more additional feedstocks comprise a T5 distillation point greater than 260° C., or wherein the one or more additional feedstocks comprise an initial boiling point greater than 260° C.; or a combination thereof.

Embodiment 6. The method of any of the above embodiments, wherein the dechlorinated mixture of feedstocks comprises 1000 wppm or less of Cl relative to a weight of the dechlorinated mixture of feedstocks.

Embodiment 7. The method of any of the above embodiments, i) wherein the purge gas comprises $O_2$; ii) wherein the feedstock mixture is maintained at the dechlorination temperature while being exposed to one or more decomposition additives; iii) wherein maintaining the feedstock mixture in the vessel further comprises forming HCl, and the purge exhaust stream further comprises at least a portion of the formed HCl wherein the purge exhaust stream further comprises at least a portion of the HCl formed in the vessel; or iv) a combination of two or more of i), ii), and iii).

Embodiment 8. The method of any of the above embodiments, wherein the plastic feedstock comprises a biomass-derived portion, the plastic feedstock comprising 1.0 wt % to 30 wt % of the feedstock mixture.

Embodiment 9. The method of any of the above embodiments, further comprising mixing the dechlorinated mixture with a supplemental feedstock prior to the processing, the dechlorinated mixture comprising 2500 wppm or less of chlorine prior to mixing the dechlorinated mixture with the supplemental feedstock, the dechlorinated mixture comprising 1000 wppm or less of chlorine after mixing the dechlorinated mixture with the supplemental feedstock.

Embodiment 10. The method of any of the above embodiments, wherein the purge exhaust stream comprises 5.0 wt % or less of volatile organic compounds relative to weight of the feedstock mixture, the method optionally further comprising performing contaminant removal on the purge exhaust stream.

Embodiment 11. The method of any of the above embodiments, wherein the chlorine-containing polymer comprises PVC, PVDC, chlorinated PVC, or a combination thereof.

Embodiment 12. The method of any of the above embodiments, wherein the plastic feedstock comprises 1.0 wt % to 30 wt % of the chlorine-containing polymer.

Embodiment 13. The method of any of the above embodiments, wherein the method further comprises forming the plastic feedstock by physically processing plastic particles to reduce a median particle size of the plastic particles to 10 cm or less; or wherein the method further comprises forming the plastic particles by physically processing bulk plastic; or a combination thereof.

Embodiment 14. A system for co-processing of a plastic feedstock, comprising: a physical processing stage comprising a plastic inlet and a physically processed plastic outlet; a mixing vessel comprising a plastic feedstock inlet, at least one additional feedstock inlet, a purge gas inlet, a purge exhaust, and a dechlorinated feedstock outlet, the plastic feedstock inlet being in solids flow communication with the physically processed plastic outlet; and at least one of a fluid catalytic cracking stage and a pyrolysis stage in fluid communication with the dechlorinated feedstock outlet.

Embodiment 15. The system of Embodiment 14, wherein the pyrolysis stage comprises at least one of a fluidized coking stage and a delayed coking stage; wherein the pyrolysis stage comprises a pyrolysis outlet, and wherein the at least one additional feedstock inlet is in fluid communication with the pyrolysis outlet; or a combination thereof.

Additional Embodiment A. A co-processing effluent made according to the method of any of Embodiments 1-13 or using the system of any of Embodiments 14-15.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for co-processing a plastic feedstock, comprising:
    mixing a plastic feedstock comprising plastic particles having an average diameter of 10 cm or less with one or more additional feedstocks to form a feedstock mixture, the plastic feedstock comprising a chlorine-containing polymer, the feedstock mixture comprising 1.0 wt % to 50 wt % of the plastic feedstock relative to a weight of the feedstock mixture, the one or more additional feedstocks comprising a T5 distillation point that is greater than a dechlorination temperature of 170° C. to 250° C.;
    maintaining the feedstock mixture in a vessel at the dechlorination temperature for 1.0 minute to 240 minutes to form a dechlorinated mixture of feedstocks;
    passing a purge stream comprising a purge gas comprising oxygen, light ends stream comprising C4-hydrocarbons, or any combination thereof through the vessel containing the feedstock mixture to form a purge exhaust stream comprising at least a portion of the purge gas; and
    processing the dechlorinated mixture of feedstocks in a co-processing stage for conversion of at least a portion of the dechlorinated mixture of feedstocks to form a conversion effluent.

2. The method of claim 1, wherein the co-processing stage comprises at least one of a pyrolysis stage, a delayed coking stage, a fluidized coking stage, and a visbreaking stage.

3. The method of claim 1, wherein the co-processing stage comprises a fluid catalytic cracking stage.

4. The method of claim 1, further comprising separating the conversion effluent to form at least one product fraction and at least one recycle fraction, the method further comprising combining the at least one recycle fraction with a) the one or more additional feedstocks prior to entering the vessel, b) the feedstock mixture in the vessel, c) the dechlorinated mixture of feedstocks after leaving the vessel and prior to processing the dechlorinated mixture of feedstocks in the co-processing stage, or d) a combination of two or more of a)-c).

5. The method of claim 1, wherein the dechlorination temperature is 170° C. to 230° C.

6. The method of claim 1, wherein the dechlorinated mixture of feedstocks comprises 1000 wppm or less of Cl relative to a weight of the dechlorinated mixture of feedstocks.

7. The method of claim 1, wherein the feedstock mixture is maintained at the dechlorination temperature while being exposed to one or more decomposition additives, or a combination thereof.

8. The method of claim 1, wherein maintaining the feedstock mixture in the vessel further comprises forming HCl, and wherein the purge exhaust stream further comprises at least a portion of the formed HCl.

9. The method of claim 1, wherein the plastic feedstock comprises a biomass-derived portion, the plastic feedstock comprising 1.0 wt % to 30 wt % of the feedstock mixture.

10. The method of claim 1, wherein the one or more additional feedstocks comprise a T5 distillation point greater than 260° C., or wherein the one or more additional feedstocks comprise an initial boiling point greater than 260° C.

11. The method of claim 1, wherein the purge exhaust stream comprises 5.0 wt % or less of volatile organic compounds relative to weight of the feedstock mixture.

12. The method of claim 11, the method further comprising performing contaminant removal on the purge exhaust stream.

13. The method of claim 1, wherein the chlorine-containing polymer comprises PVC, PVDC, chlorinated PVC, or a combination thereof.

14. The method of claim 1, wherein the plastic feedstock comprises 1.0 wt % to 30 wt % of the chlorine-containing polymer.

15. The method of claim 1, wherein the method further comprises forming the plastic feedstock by physically processing plastic particles to reduce a median particle size of the plastic particles to 10 cm or less; or wherein the method further comprises forming the plastic particles by physically processing bulk plastic; or a combination thereof.

16. The method of claim 1, further comprising mixing the dechlorinated mixture with a supplemental feedstock prior to the processing, the dechlorinated mixture comprising 2500 wppm or less of chlorine prior to mixing the dechlorinated mixture with the supplemental feedstock, the dechlorinated mixture comprising 1000 wppm or less of chlorine after mixing the dechlorinated mixture with the supplemental feedstock.

17. A system for co-processing of a plastic feedstock, comprising:
    a physical processing stage comprising a plastic inlet and a physically processed plastic outlet;
    a mixing vessel comprising a plastic feedstock inlet, at least one additional feedstock inlet, a purge gas inlet coupled to an oxygen source for injection to the mixing vessel containing a feedstock, a purge exhaust, and a dechlorinated feedstock outlet, the plastic feedstock inlet being in solids flow communication with the physically processed plastic outlet; and
    a fluid catalytic cracking stage in fluid communication with the dechlorinated feedstock outlet.

18. A system for co-processing of a plastic feedstock, comprising:
    a physical processing stage comprising a plastic inlet and a physically processed plastic outlet;

a mixing vessel comprising a plastic feedstock inlet, at least one additional feedstock inlet, a purge gas inlet, a purge exhaust, and a dechlorinated feedstock outlet, the plastic feedstock inlet being in solids flow communication with the physically processed plastic outlet; and a pyrolysis stage in fluid communication with the dechlorinated feedstock outlet.

19. The system of claim 18, wherein the pyrolysis stage comprises at least one of a fluidized coking stage and a delayed coking stage.

20. The system of claim 18, wherein the pyrolysis stage comprises a pyrolysis outlet, and wherein the at least one additional feedstock inlet is in fluid communication with the pyrolysis outlet.

21. A method for co-processing a plastic feedstock, comprising:

mixing a plastic feedstock comprising plastic particles having an average diameter of 10 cm or less with one or more additional feedstocks to form a feedstock mixture, the plastic feedstock comprising a chlorine-containing polymer, the feedstock mixture comprising 1.0 wt % to 50 wt % of the plastic feedstock relative to a weight of the feedstock mixture, the one or more additional feedstocks comprising a T10 distillation point that is greater than a dechlorination temperature of 170° C. to 300° C.;

maintaining the feedstock mixture in a vessel at the dechlorination temperature for 1.0 minute to 240 minutes to form a dechlorinated mixture of feedstocks;

passing a purge stream comprising a purge gas comprising oxygen in an amount from about 0.1 time to 10 times a molar amount of chlorine present in the chlorine-containing polymer through the vessel containing the feedstock mixture to form a purge exhaust stream comprising at least a portion of the purge gas; and processing the dechlorinated mixture of feedstocks in a co-processing stage for conversion of at least a portion of the dechlorinated mixture of feedstocks to form a conversion effluent, the processing in the co-processing stage comprising a) a temperature of 475° C. or higher, b) a temperature that is greater than the dechlorination temperature by 200° C. or more, or c) a combination of a) and b).

22. The method of claim 21, wherein the one or more additional feedstocks comprise a T5 distillation point that is greater than the dechlorination temperature, or wherein the one or more additional feedstocks comprise an initial boiling point that is greater than the dechlorination temperature.

23. The method of claim 21, the method further comprising performing contaminant removal on the purge exhaust stream.

24. The method of claim 21, further comprising separating the conversion effluent to form at least one product fraction and at least one recycle fraction, the method further comprising combining the at least one recycle fraction with a) the one or more additional feedstocks prior to entering the vessel, b) the feedstock mixture in the vessel, c) the dechlorinated mixture of feedstocks after leaving the vessel and prior to processing the dechlorinated mixture of feedstocks in the co-processing stage, or d) a combination of two or more of a)-c).

25. The method of claim 21, wherein the chlorine-containing polymer comprises PVC, PVDC, chlorinated PVC, or a combination thereof, the plastic feedstock comprises 1.0 wt % to 30 wt % of the chlorine-containing polymer.

* * * * *